United States Patent
Schenk

(10) Patent No.: US 8,009,574 B2
(45) Date of Patent: Aug. 30, 2011

(54) POWER LEVEL SETTINGS FOR TRANSMISSION LINES

(75) Inventor: Heinrich Schenk, München (DE)

(73) Assignee: Lantiq Deutschland GmbH, Neubiberg (DE)

( * ) Notice: Subject to any disclaimer, the term of this patent is extended or adjusted under 35 U.S.C. 154(b) by 1372 days.

(21) Appl. No.: 11/534,952

(22) Filed: Sep. 25, 2006

(65) Prior Publication Data

US 2008/0074995 A1    Mar. 27, 2008

(51) Int. Cl.
    *H04J 1/16* (2006.01)
(52) U.S. Cl. ................................ 370/252; 370/201
(58) Field of Classification Search .................. 370/201, 370/241–253; 455/13.4, 522
    See application file for complete search history.

(56) References Cited

U.S. PATENT DOCUMENTS

| | | | | |
|---|---|---|---|---|
| 5,225,922 A * | 7/1993 | Chraplyvy et al. | ............. | 398/94 |
| 6,609,008 B1 * | 8/2003 | Whang et al. | ................ | 455/522 |
| 6,856,454 B2 * | 2/2005 | Pavel et al. | .................... | 359/337 |
| 6,856,768 B2 * | 2/2005 | Gnauck et al. | ................. | 398/83 |
| 7,068,932 B2 * | 6/2006 | Wan et al. | ........................ | 398/25 |
| 7,386,236 B1 * | 6/2008 | Kuo et al. | ....................... | 398/99 |
| 2003/0086514 A1 | 5/2003 | Ginis et al. | ................... | 375/346 |
| 2003/0099350 A1 * | 5/2003 | Bostoen et al. | ............... | 379/417 |
| 2004/0158855 A1 * | 8/2004 | Gu et al. | ......................... | 725/39 |
| 2004/0258223 A1 * | 12/2004 | Rahamim | ................. | 379/93.28 |
| 2007/0201877 A1 * | 8/2007 | Epps et al. | .................... | 398/154 |
| 2010/0150207 A1 * | 6/2010 | Lomp | ........................... | 375/130 |

OTHER PUBLICATIONS

Cioffi et al. "A Temporary Model for EFM/MIMO Cable Characterization" (3 pages), Oct. 23, 2001.
Editor DSM Technical Report "Letter Ballot Draft of the DSM Technical Report" (100 pages), Jun. 26, 2006.
Transmission and Multiplexing (TM); Access transmission systems on metallic access cables; Very high speed Digital Subscriber Line (VDSL); Part I: Functional Requirements (82 pages), 2003.

* cited by examiner

*Primary Examiner* — Ricky Ngo
*Assistant Examiner* — Kan Yuen
(74) *Attorney, Agent, or Firm* — Eschweiler & Associates, LLC

(57) ABSTRACT

A method, wherein the following steps are iteratively repeated: providing each of a plurality of signals at a respective one of a plurality of transmission links; transmitting each of the plurality of signals over the respective one of the plurality of transmission links; and measuring signal-to-noise ratios of the plurality of signals transmitted over the plurality of transmission links, wherein an input power level of each of the plurality of signals is set such that the signal-to-noise ratios of the plurality of signals converge when measured after their transmission over the plurality of transmission links.

28 Claims, 15 Drawing Sheets

FIG 4
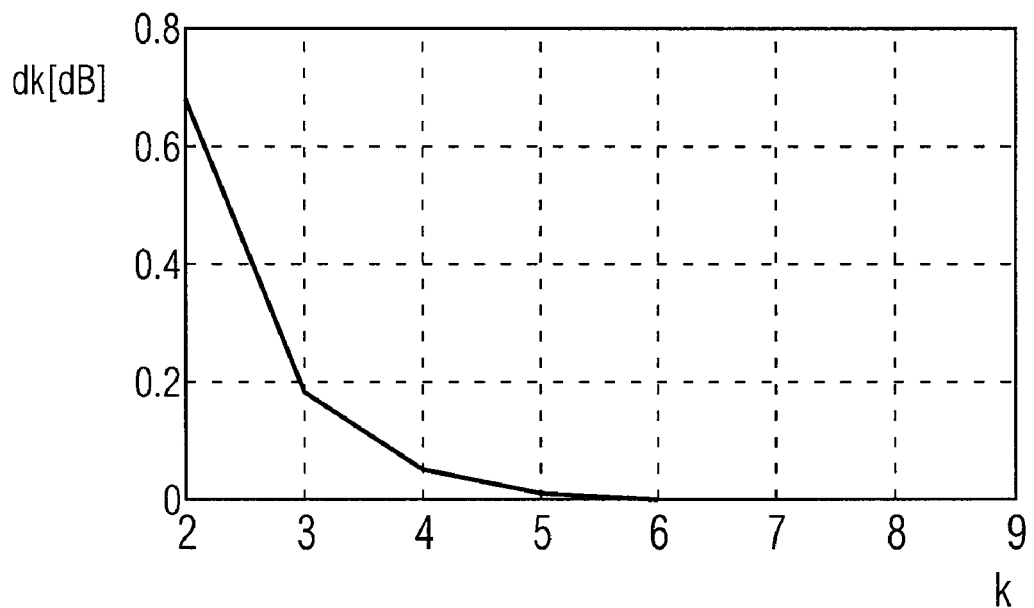
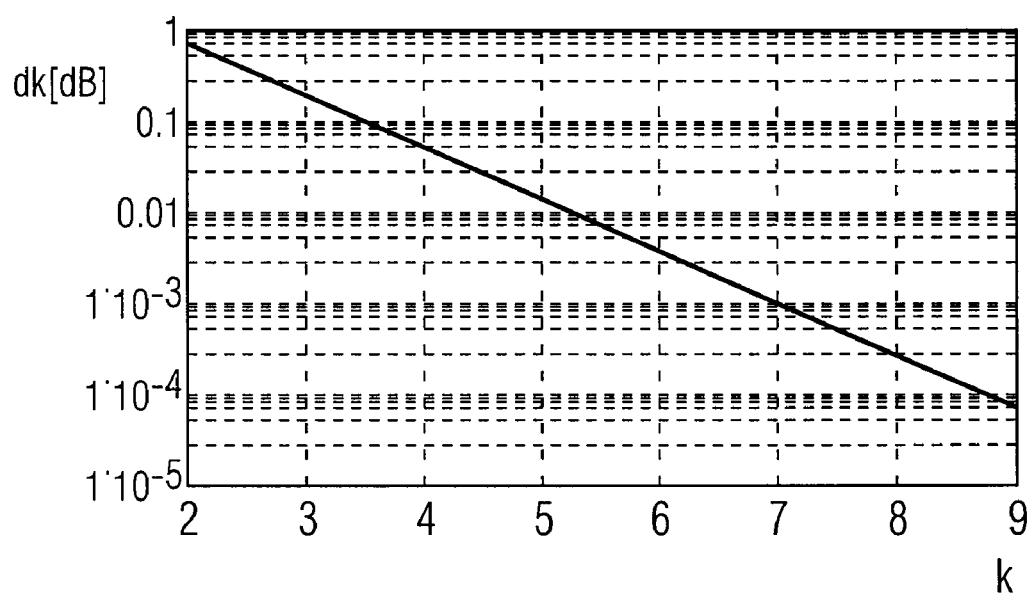

— max. line length
---- min. line length

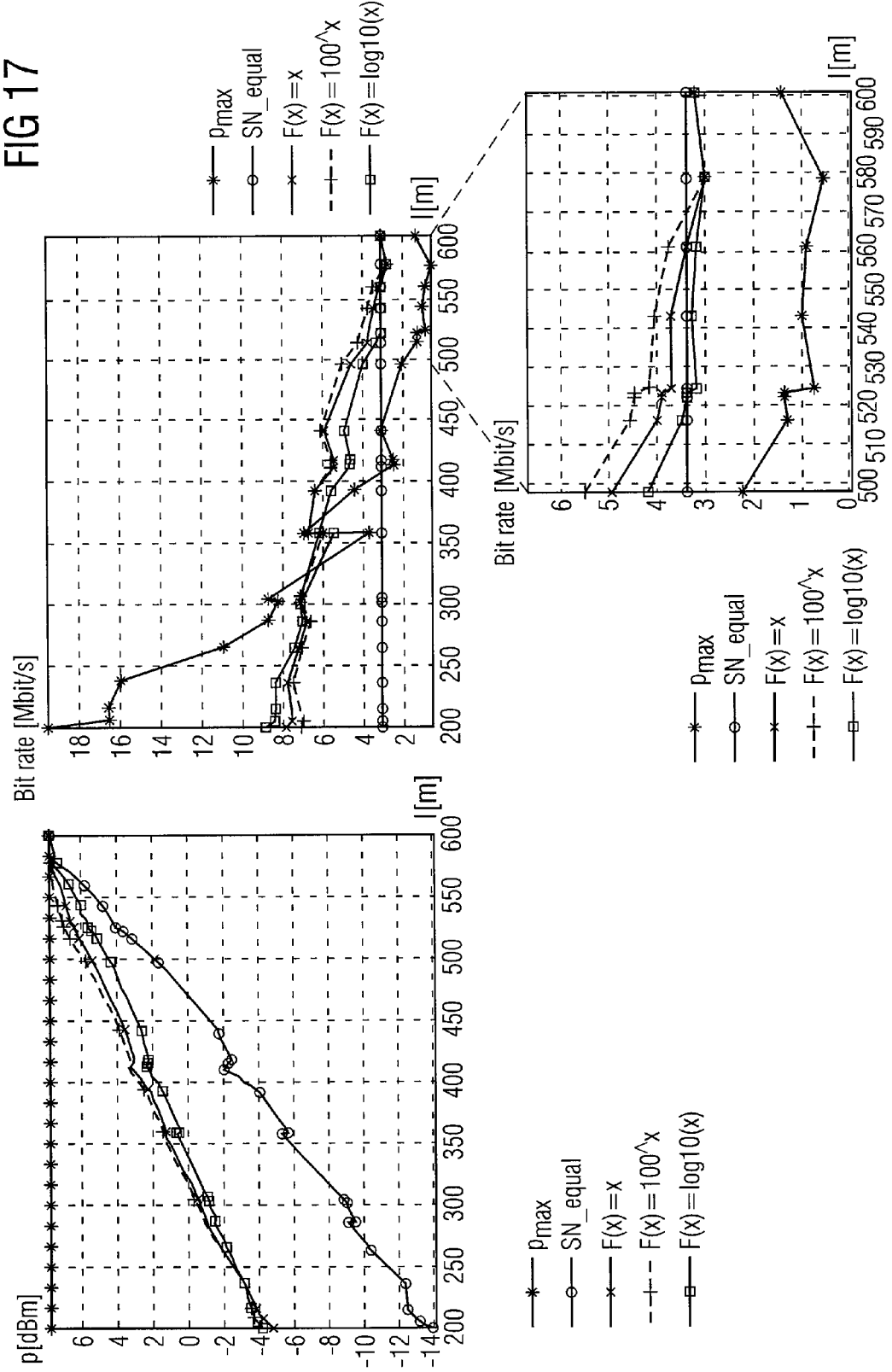

POWER LEVEL SETTINGS FOR TRANSMISSION LINES

TECHNICAL FIELD

This invention relates to transmission lines in general and more particularly to power level settings for bundled transmission lines.

BACKGROUND

Telecommunication and broadband services are usually provided to customer premises via twisted pairs of wires. The twisted pairs are often grouped in close proximity into binder groups. Data transmission in these settings may suffer from interference arising from electromagnetic coupling between neighboring twisted pairs, referred to as crosstalk interference.

SUMMARY

A method may comprise the following steps that are iteratively repeated: providing each of a plurality of signals at a respective one of a plurality of transmission links; transmitting each of the plurality of signals over the respective one of the plurality of transmission links; and measuring signal-to-noise ratios of the plurality of signals transmitted over the plurality of transmission links, wherein an input power level of each of the plurality of signals is set such that the signal-to-noise ratios of the plurality of signals converge when measured after their transmission over the plurality of transmission links.

BRIEF DESCRIPTION OF THE DRAWINGS

FIG. 4 illustrates the convergence of an iterative method according to an embodiment.

FIG. 17 illustrates exemplary results of a simulation of an iterative method according to an embodiment.

DETAILED DESCRIPTION

Figure 1:
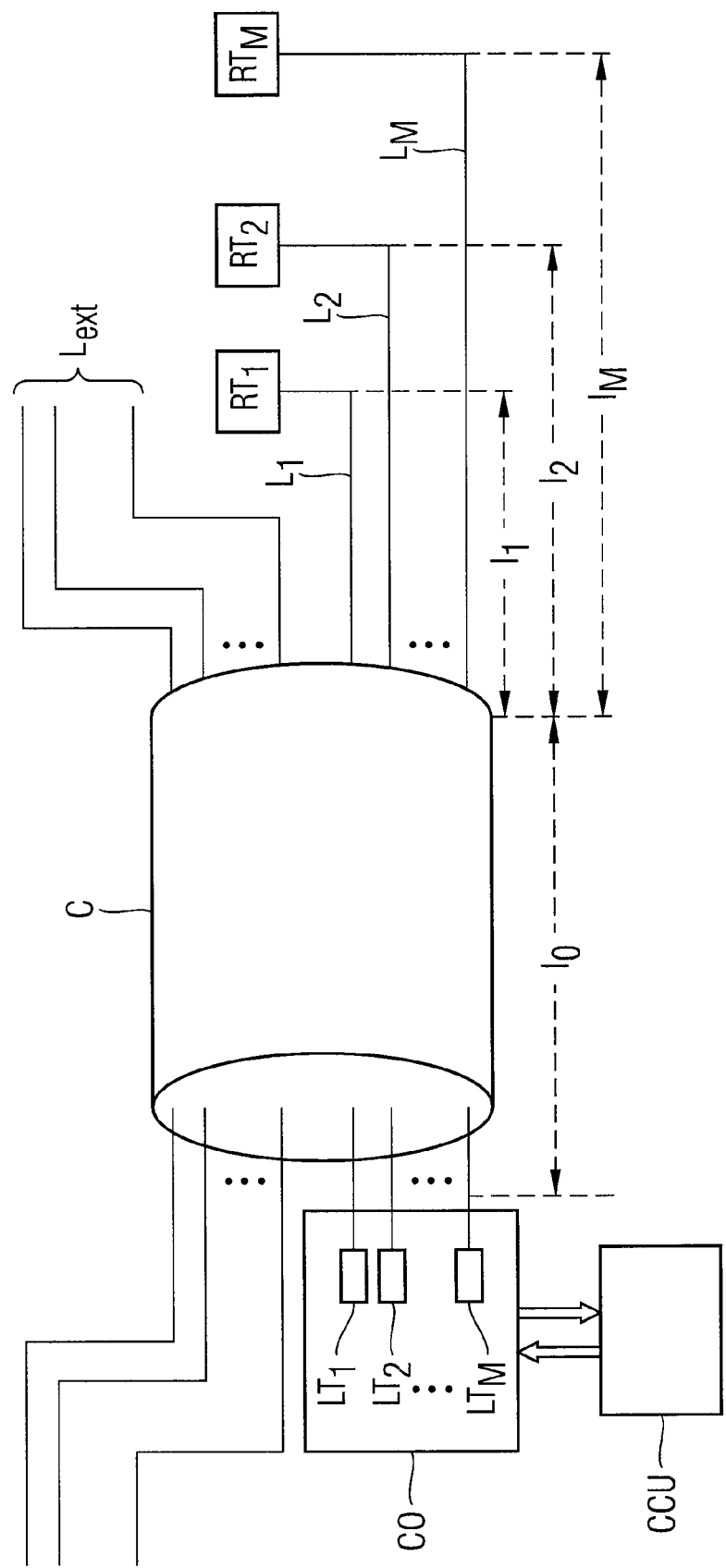
FIG. 1 schematically illustrates a network of a plurality of transmission lines $L_1$ to $L_M$ according to an embodiment.

In the following one or more embodiments are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of embodiments. It may be evident, however, to one skilled in the art that one or more aspects of the embodiments may be practiced with a lesser degree of these specific details. In other instances, known structures and devices are shown in block diagram form in order to facilitate describing one or more aspects of the embodiments. The following description is therefore not to be taken in a limiting sense, and the scope of the invention is defined by the appended claims.

Referring to FIG. 1, a schematic diagram of a network of a plurality of transmission lines $L_1$ to $L_M$ is shown. The transmission lines $L_1$ to $L_M$ are bundled together within a cable C over a length $l_0$. The network has a central office CO comprising a plurality of transceivers $LT_1$ to $LT_M$ coupled to the respective ends of the transmission lines $L_1$ to $L_M$. At the subscriber premises transceivers $RT_1$ to $RT_M$ are coupled to the other respective ends of the transmission lines $L_1$ to $L_M$. The transceivers $RT_1$ to $RT_M$ may, for example, be modems. Data transmission from the central office CO to a subscriber is called downstream data transmission, whereas data transmission from a subscriber to the central office CO is called upstream data transmission.

According to one embodiment, at least two of the transmission lines $L_1$ to $L_M$ have different lengths. In the network shown in FIG. 1 the length of a transmission line $L_i$ is the sum of the length $l_0$ and a length $l_i$ ($i=1,\ldots,M$). The length $l_0$ is the length over which the transmission lines $L_1$ to $L_M$ are bundled together and occupy the same cable C. The length $l_i$ is the length from the end of the cable C to the transceiver $RT_i$. Each of the transmission lines $L_1$ to $L_M$ may, for example, be a pair of twisted wires.

According to a further embodiment, the cable C further comprises transmission lines $L_{ext}$, which are not coupled to the central office CO.

According to yet a further embodiment, each of the transmission lines $L_1$ to $L_M$ forms a telecommunication channel. Since voice telephony uses only a small fraction of the bandwidth usually available on the transmission lines $L_1$ to $L_M$, the remaining fraction of the available bandwidth may be used for transmitting data. For data transmission there are a number of services available, such as ISDN (Integrated Services Digital Network) or ADSL (Asymmetric Digital Subscriber Line) or VDSL (Very high bit-rate Digital Subscriber Line) or VDSL2 (Very high bit-rate Digital Subscriber Line 2).

Due to the close proximity of the transmission lines $L_1$ to $L_M$ within the cable C of the length $l_0$, there is considerable amount of crosstalk interference between different neighboring transmission lines $L_1$ to $L_M$. Physically, there are two types of interference: near-end crosstalk (NEXT) and far-end crosstalk (FEXT).

NEXT refers to interference between neighboring transmission lines $L_1$ to $L_M$ that arises when signals are transmitted in opposite directions. If the neighboring lines carry the same type of service, then the interference is called self-NEXT.

FEXT refers to interference between neighboring transmission lines $L_1$ to $L_M$ that arises when signals are transmitted in the same direction. If the neighboring transmission lines $L_1$ to $L_M$ carry the same type of service, then the interference is called self-FEXT.

Furthermore, noise can be coupled to the transmission lines $L_1$ to $L_M$ that is generated by other sources than neighboring transmission lines $L_1$ to $L_M$. This noise is called alien noise and may, for example, be generated by the transmission lines $L_{ext}$.

In case of NEXT and FEXT, the interfering signals coupled to the transmission lines $L_1$ to $L_M$ depend on the power levels of the signals transmitted over the transmission lines $L_1$ to $L_M$. If signals having the same power level are inputted simultaneously in each of the transmission lines $L_1$ to $L_M$, the signal-to-noise ratio of a transmission line having a longer length will be worse than the signal-to-noise ratio of a shorter transmission line. The reason is that the longer the length of the transmission line, the more the signal transmitted over the transmission line is attenuated.

According to one embodiment, input power levels $p(k_{max})_1$ to $p(k_{max})_M$ for the transmission lines $L_1$ to $L_M$ are determined, which allow the same transmission behavior for all subscribers coupled to the transmission lines $L_1$ to $L_M$. For these purposes, an iterative method is employed with k being the iteration index (k=1, ..., $k_{max}$). At each iteration cycle k, signals $u(k)_1$ to $u(k)_M$ are provided to the transmission lines $L_1$ to $L_M$ having input power levels $p(k)_1$ to $p(k)_M$. The signals $u(k)_1$ to $u(k)_M$ are transmitted over the transmission lines $L_1$ to $L_M$ and signals $y(k)_1$ to $y(k)_M$ are received at the other ends of the transmission lines $L_1$ to $L_M$. When receiving the transmitted signals $y(k)_1$ to $y(k)_M$ signal-to-noise ratios $Sn(k)_1$ to $Sn(k)_M$ of the transmitted signals $y(k)_1$ to $y(k)_M$ are measured. The aforementioned steps are iteratively repeated, wherein the input power levels $p(k)_1$ to $p(k)_M$ of the signals $u(k)_1$ to $u(k)_M$ when provided to the transmission lines $L_1$ to $L_M$ are set in such a manner that the signal-to-noise ratios $Sn(k)_1$ to $Sn(k)_M$ converge.

According to a further embodiment, the transmission lines $L_1$ to $L_M$ may be wireless transmission links. When it is referred to transmission lines in the following, the transmission lines may therefore also be replaced by wireless transmission links.

According to a further embodiment, xDSL is used as service for transmitting data over the transmission lines $L_1$ to $L_M$.

According to a further embodiment, signals $u(k)_1$ to $u(k)_M$ are transmitted in upstream direction over the transmission lines $L_1$ to $L_M$.

According to a further embodiment, the iterative method is performed during the initialization of the central office CO.

According to a further embodiment, the input power levels $p(k_{max})_1$ to $p(k_{max})_M$ are used for transmitting further signals $u_1$ to $u_M$ over the transmission lines $L_1$ to $L_M$.

According to a further embodiment, the signals $u(k)_1$ to $u(k)_M$ are statistically selected data modulated on a transmission frequency.

According to a further embodiment, the input power levels $p(k+1)_1$ to $p(k+1)_M$ of the signals $u(k+1)_1$ to $u(k+1)_M$ when provided to the transmission lines $L_1$ to $L_M$ during an iteration cycle k+1 depend on the measured signal-to-noise ratios $Sn(k)_1$ to $Sn(k)_M$ measured during the previous iteration cycle k.

According to a further embodiment, the input power level $p(k+1)_i$ of the signal $u(k+1)_i$ (i=1, ..., M) when provided to the transmission line $L_i$ during an iteration cycle k+1 is a function F of the difference of the measured signal-to-noise ratio $Sn(k)_i$ of the signal $y(k)_i$ transmitted over the transmission line $L_i$ during the previous iteration cycle k and an average value avg of the signal-to-noise ratios $Sn(k)_1$ to $Sn(k)_M$ measured during the previous iteration cycle k:

$$p(k+1)_i = F[Sn(k)_i - avg(Sn(k)_1, \ldots, Sn(k)_M)]. \tag{1}$$

According to a further embodiment, the input power level $p(k+1)_i$ of the signal $u(k+1)_i$ (i=1, ..., M) when provided to the transmission line $L_i$ during an iteration cycle k+1 depends on a product having at least a factor $F_1$ and a factor $F_2$. The factor $F_1$ is a function of the input power level $p(k)_i$ of the signal $u(k)_i$ when provided to the transmission line $L_i$ during the previous iteration cycle k. The factor $F_2$ is a function of the difference of the measured signal-to-noise ratio $Sn(k)_i$ of the signal $y(k)_i$ transmitted over the transmission line $L_i$ during the previous iteration cycle k and an average value avg of the signal-to-noise ratios $Sn(k)_1$ to $Sn(k)_M$ measured during the previous iteration cycle k:

$$p(k+1)_i = F_1[p(k)_i] \cdot F_2[Sn(k)_i - avg(Sn(k)_1, \ldots, Sn(k)_M)]. \tag{2}$$

According to a further embodiment, the input power levels $p(1)_1$ to $p(1)_M$ of the signals $u(1)_1$ to $u(1)_M$ at the first iteration cycle (k=1) are predetermined. For example, the input power levels $p(1)_1$ to $p(1)_M$ are set to the highest power level.

According to a further embodiment, the input power level $p(2)_i$ of the signal $u(2)_i$ (i=1, ..., M) at the second iteration cycle (k=2) depends on the inverted value of the measured signal-to-noise ratio $Sn(1)_i$ of the transmitted signal $y(1)_i$ of the first iteration cycle (k=1).

According to another embodiment, a method refers to a plurality of transmission lines $L_1$ to $L_M$ each having an input terminal and an output terminal. Referring to FIG. 1, the input terminals may, for example, be the transceivers $LT_1$ to $LT_M$ of the central office CO and the output terminals may be the transceivers $RT_1$ to $RT_M$ at the subscribers end or vice versa.

According to the method of the present embodiment, first signals $u(k)_1$ to $u(k)_M$ are provided to the input terminals and transmitted over the transmission lines $L_1$ to $L_M$. At the output terminals of the transmission lines $L_1$ to $L_M$ transmitted first signals $y(k)_1$ to $y(k)_M$ are received. Further, signal-to-noise ratios $Sn(k)_1$ to $Sn(k)_M$ of the transmitted first signals $y(k)_1$ to $y(k)_M$ are measured at the output terminals of the transmission lines $L_1$ to $L_M$. Subsequently, second signals $u(k+1)_1$ to $u(k+1)_M$ are provided to the input terminals and are transmitted over the transmission lines $L_1$ to $L_M$. The input power levels $p(k+1)_1$ to $p(k+1)_M$ of the second signals $u(k+1)_1$ to $u(k+1)_M$ are set depending on the measured signal-to-noise ratios $Sn(k)_1$ to $Sn(k)_M$ of the afore transmitted first signals $y(k)_1$ to $y(k)_M$.

The measured signal-to-noise ratios $Sn(k)_1$ to $Sn(k)_M$ of the transmitted first signals $y(k)_1$ to $y(k)_M$ are distributed over a first range of signal-to-noise ratios. The distribution of the measured signal-to-noise ratios $Sn(k)_1$ to $Sn(k)_M$ thus defines the first range. According to one embodiment, the input power levels $p(k+1)_1$ to $p(k+1)_M$ of the second signals $u(k+1)_1$ to $u(k+1)_M$ are set in such a manner that the signal-to-noise ratios $Sn(k+1)_1$ to $Sn(k+1)_M$ of the second signals $y(k+1)_1$ to $y(k+1)_M$ after their transmission over the transmission lines $L_1$ to $L_M$ are distributed over a second range of signal-to-noise ratios which is smaller than the first range. This procedure results in a convergence of the signal-to-noise ratios.

According to another embodiment, a transfer function of each of the transmission lines $L_1$ to $L_M$ is determined and information related to interference characteristics of each of the transmission lines $L_1$ to $L_M$ is collected. Furthermore, the transfer functions and the information related to interference characteristics are used to determine input power levels $p_1$ to $p_M$ of signals $u_1$ to $u_M$ in such a manner that, when providing the signals $u_1$ to $u_M$ to the input terminals of the transmission lines $L_1$ to $L_M$ and measuring the signal-to-noise ratios $Sn_1$ to $Sn_M$ of the transmitted signals $y_1$ to $y_M$ at the output terminals of the transmission lines $L_1$ to $L_M$, the signal-to-noise ratios $Sn_1$ to $Sn_M$ are essentially equal. For example, the signal-to-noise ratios $Sn_1$ to $Sn_M$ are essentially equal if the signal-to-noise ratios $Sn_1$ to $Sn_M$ are within a predetermined range or a predetermined error range.

According to another embodiment, input power levels $\tilde{p}(0)_1$ to $\tilde{p}(0)_M$ for the transmission lines $L_1$ to $L_M$ are provided. The input power levels $\tilde{p}(0)_1$ to $\tilde{p}(0)_M$ are provided in such a manner that when signals $\tilde{u}(0)_1$ to $\tilde{u}(0)_M$ having the input power levels $\tilde{p}(0)_1$ to $\tilde{p}(0)_M$ are provided to the transmission lines $L_1$ to $L_M$, signals $\tilde{y}(0)_1$ to $\tilde{y}(0)_M$ are received at the other ends of the transmission lines $L_1$ to $L_M$ having essentially equal signal-to-noise ratios $\tilde{S}n(0)_1$ to $\tilde{S}n(0)_M$. For example, the input power levels $\tilde{p}(0)_1$ to $\tilde{p}(0)_M$ resulting in equal signal-to-noise ratios $\tilde{S}n(0)_1$ to $\tilde{S}n(0)_M$ may be determined by using one of the methods described above. The signal-to-noise ratios $\tilde{S}n(0)_1$ to $\tilde{S}n(0)_M$ are essentially equal if the signal-to-noise ratios $\tilde{S}n(0)_1$ to $\tilde{S}n(0)_M$ are within a predetermined range or a predetermined error range.

Subsequently, the following steps are iteratively repeated. Signals $\tilde{u}(k)_1$ to $\tilde{u}(k)_M$ are provided to the transmission lines $L_1$ to $L_M$ (k=1, 2, ... ). The signals $\tilde{u}(k)_1$ to $\tilde{u}(k)_M$ are transmitted over the transmission lines $L_1$ to $L_M$ and signals $\tilde{y}(k)_1$ to $\tilde{y}(k)_M$ are received at the other ends of the transmission lines $L_1$ to $L_M$. The signal-to-noise ratios $\tilde{S}n(k)_1$ to $\tilde{S}n(k)_M$ of the transmitted signals $\tilde{y}(k)_1$ to $\tilde{y}(k)_M$ are measured. At each iteration cycle k+1 the input power level $\tilde{p}(k+1)_i$ of the signal $\tilde{u}(k+1)_i$ (i=1, . . . , M−1) is greater than the input power level $\tilde{p}(k)_i$ of the signal $\tilde{u}(k)_i$ of the previous iteration cycle k.

According to a further embodiment, the method is terminated or at least interrupted when at least one of the measured signal-to-noise ratios $\tilde{S}n(k)_1$ to $\tilde{S}n(k)_M$ exceeds a predetermined threshold.

According to a further embodiment, the input power level $\tilde{p}(k+1)_i$ of the signal $\tilde{u}(k+1)_i$ (i=1, . . . , M−1) when provided to the transmission line $L_i$ during an iteration cycle k+1 depends on a product having at least a factor $F_1$ and a factor $F_2$. The factor $F_1$ is a function of the input power level $\tilde{p}(k)_i$ of the signal $\tilde{u}(k)_i$ provided to the transmission line $L_i$ during the previous iteration cycle k. The factor $F_2$ depends on a linear function or an exponential function or a logarithmic function of the input power level $\tilde{p}(k)_i$ of the signal $\tilde{u}(k)_i$ of the previous iteration cycle k:

$$\tilde{p}(k+1)_i = F_1[\tilde{p}(k)_i] \cdot F_2[\tilde{p}(k)_i]. \quad (3)$$

In the following another embodiment is described in more detail. In this embodiment the frequency band used for transmitting signals in downstream direction is different from the frequency band used for transmitting signals in upstream direction. As a consequence, self-NEXT can be excluded as a source of interference, however self-FEXT must be considered. For example, VDSL or ADSL may be used as services for transmitting data over the transmission lines and DMT (Discrete Multi-Tone) modulation may be used for modulating signals, however the embodiment described in the following is not limited thereto. The present embodiment may be also applied to a system which uses the same frequency band, but different time slots for downstream and upstream directions.

The network of the transmission lines $L_1$ to $L_M$ of the present embodiment is shown in FIG. 1. The transceivers $LT_1$ to $LT_M$ of the central office CO as well as the transceivers $RT_1$ to $RT_M$ at the subscriber premises comprise units which allow to measure the signal-to-noise ratios of signals received over the respective transmission lines $L_1$ to $L_M$. The values of the measured signal-to-noise ratios are transferred to a central control unit CCU, which is coupled to the central office CO. The central control unit CCU sets the power levels of the signals transmitted by the transceivers $LT_1$ to $LT_M$ and $RT_1$ to $RT_M$. Special transmission and control channels are provided between the central office CO and the transceivers $RT_1$ to $RT_M$ in order to exchange data between the central control unit CCU and the transceivers $RT_1$ to $RT_M$.

Figure 2:
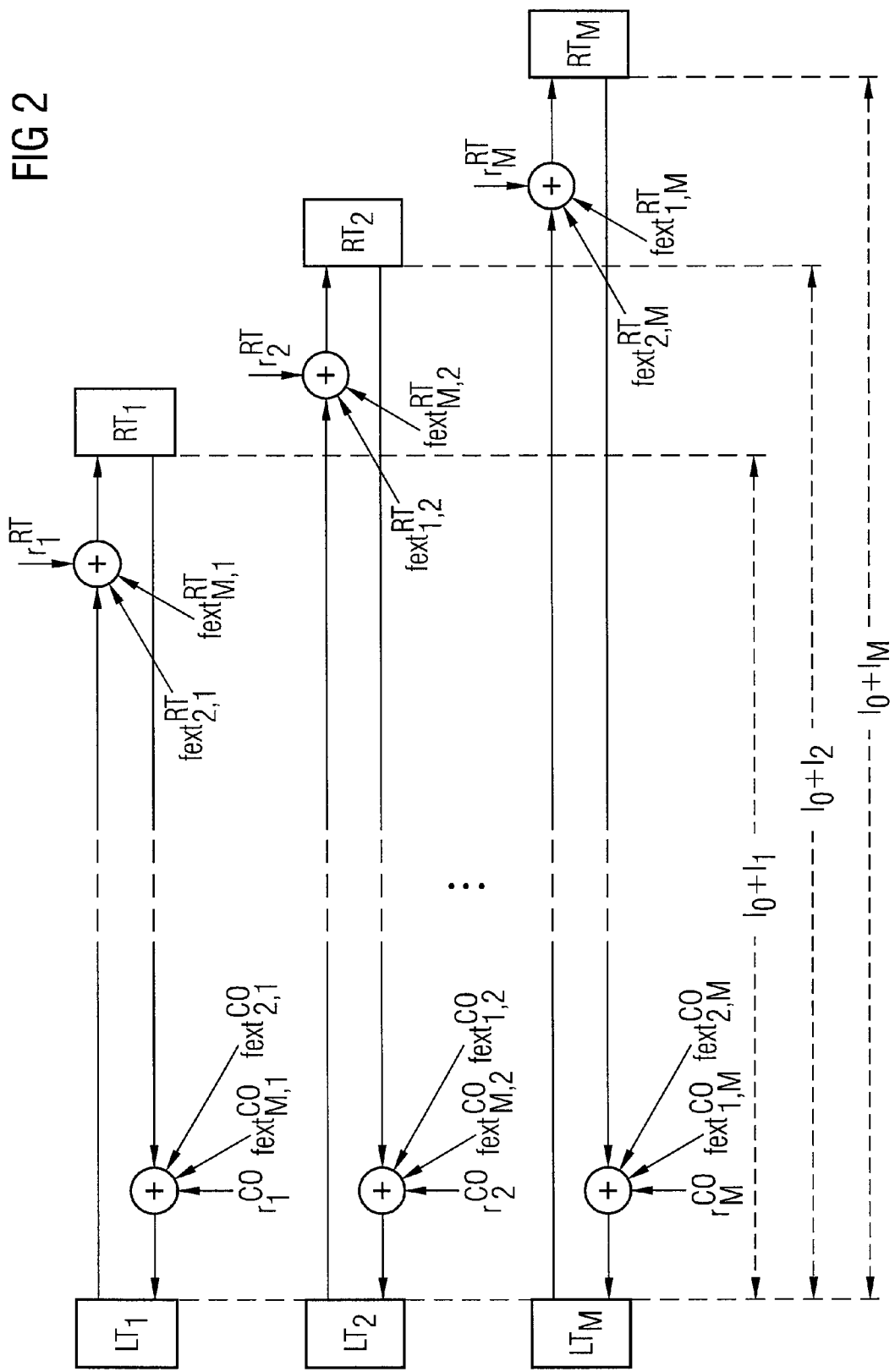
FIG. 2 illustrates a model of a transmission system.

FIG. 2 illustrates a model of the transmission system of the present embodiment. The model only considers the transmission lines $L_1$ to $L_M$ which are coupled to the central office CO. The arrows between the transceivers $LT_i$ and $RT_i$ illustrate the logical connections between the transceivers $LT_i$ and $RT_i$ (i=1, . . . , M). Since it is assumed that there is no crosstalk interference between downstream and upstream directions, the power levels in downstream and upstream directions can be determined separately.

As can be seen from FIG. 2, self-FEXT signals fext and interfering signals r disturb the signals transmitted between the transceivers $LT_i$ and $RT_i$. The interfering signals r are caused by alien noise which may be due to the transmission lines $L_{ext}$, which are not coupled to the central office CO, and other external sources.

Figure 3:
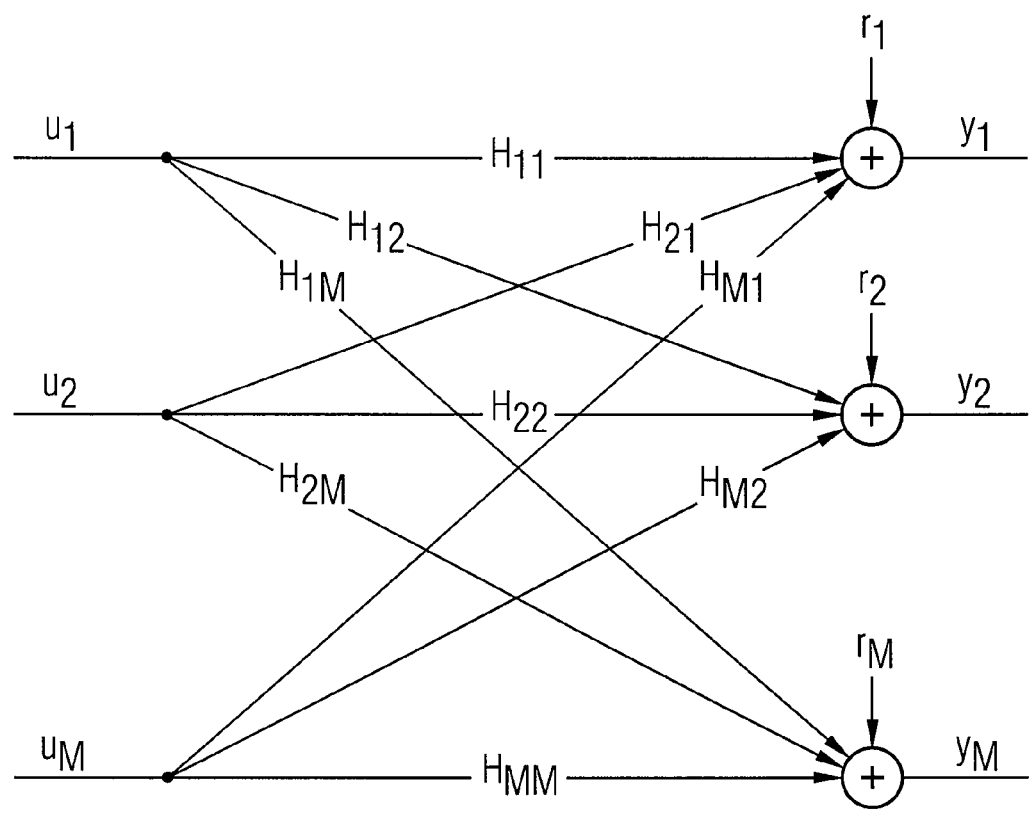
FIG. 3 illustrates an interference channel model showing crosstalk interference among the transmission lines $L_1$ to $L_M$.

In FIG. 3 an interference channel model is illustrated exhibiting crosstalk interference among the transmission lines $L_1$ to $L_M$ in either downstream or upstream direction. A signal $u_i$ is provided to the input terminal of a transmission line $L_i$ and a signal $y_i$ is received at the output terminal of the transmission line $L_i$ (i=1, . . . , M). A transfer function $H_{ij}$ is the transfer function of a channel from the input terminal of a transmission line $L_i$ to the output terminal of the transmission line $L_j$ for a specific frequency channel (j=1, . . . , M). The transfer functions $H_{ii}$ are the transfer functions of the transmission lines $L_1$ to $L_M$ and the transfer functions $H_{ij,i\neq j}$ are the crosstalk transfer functions.

According to the interference channel model shown in FIG. 3, the signal $y_i$ received at the output terminal of the transmission line $L_i$ is as follows:

$$y_i = u_i \cdot H_{ii} + \sum_{j=1, j\neq i}^{M} u_j \cdot H_{ij} + r_i. \quad (4)$$

Assuming that the signals transmitted over different transmission lines are not correlated, the signal-to-noise ratio $Sn_i$ at the output terminal of the transmission line $L_i$, which is the ratio between the power S of the wanted signal and the power N of the noise, is given by the following equation:

$$Sn_i = \left(\frac{S}{N}\right)_i = \frac{\langle u^2 \rangle_i \cdot |H_{ii}|^2}{\sum_{j=1, j\neq i}^{M} \langle u^2 \rangle_j \cdot |H_{ij}|^2 + \langle r^2 \rangle_i}. \quad (5)$$

Since many signals have a very wide dynamic range, signal-to-noise ratios are usually expressed in terms of the logarithmic decibel scale. In decibels, the logarithmic signal-to-noise ratio $Sndb_i$ is 10 times the logarithm of the power ratio $Sn_i$:

$$Sndb_i = 10 \cdot \log_{10}\left(\left(\frac{S}{N}\right)_i\right) \quad (6)$$

In order to be able to transmit high bit rates, the values of the signal-to-noise ratio $Sn_i$ should be large. The number e of bits, which can be transmitted per frequency channel and data symbol, is:

$$e = \text{floor}\left(\log_2\left(1 + \frac{Sn}{Sn_{ref}}\right)\right) \quad (7)$$

$Sn_{ref}$ is a reference signal-to-noise ratio, which depends on the wanted bit error rate, the margins and the coding gain.

As can be seen from equation (5), the signal-to-noise ratio $Sn_i$ measured at the output terminal of the transmission line $L_i$ depends on the power levels of the signals $u_1$ to $u_M$, the transfer function $H_{ii}$, the transfer functions $H_{ij,j\neq i}$ and the power level of the alien noise interference signal $r_i$. Two extreme cases may arise:

(a) FEXT can be neglected compared to alien noise. In this case the signal-to-noise ratio $Sn_i$ only depends on the input power level of the signal $u_i$. In order to achieve a high signal-to-noise ratio $Sn_i$, it is favorable to feed the transmission lines $L_1$ to $L_M$ with signals $u_1$ to $u_M$ at the highest power level.

(b) Alien noise can be neglected compared to FEXT. In this case the signal-to-noise ratio $Sn_i$ depends on the input power levels of all signals $u_1$ to $U_M$. If the signals $u_1$ to $u_M$ have equal input power levels, shorter transmission lines $L_i$ produce better signal-to-noise ratios $Sn_i$.

A conditional equation for the transfer function $H_{ij}$ can be derived:

$$|H_{ij}(f)| = K_{ij} \cdot f \sqrt{l_0} \cdot |H_{line}(f)| \quad (8)$$

Based on a more realistic model, the following equation was found for the transfer function $H_{ij}$:

$$|H_{ij}(f)| = \quad (9)$$

$$K_{ij} \cdot f \cdot \sqrt{l_0} \cdot |H_{line}(f)| \cdot \left[1 + 3 \cdot \cos\left(\frac{2 \cdot \pi \cdot l_0}{c_{line}}\right) - 3 \cdot \sin\left(\frac{2 \cdot \pi \cdot l_0}{c_{line}}\right)\right]$$

In equations (8) and (9) f is the frequency, $l_0$ is the length of the cable C which binds the transmission lines $L_i$ and $L_j$ together, $K_{ij}$ is a frequency- and length-independent factor, which depends on physical and geometrical features of the cable C, $H_{line}(f)$ is the frequency response of the transmission lines $L_i$ and $L_j$ and c is the speed of light in the transmission lines $L_i$ and $L_j$, which is roughly 200,000 km/s.

In the following a method is discussed as an exemplary embodiment, which allows to determine the input power levels $p_1$ to $p_M$ for signals provided to the input terminals of the transmission lines $L_1$ to $L_M$ so that the signals received at the output terminals of the transmission lines $L_1$ to $L_M$ exhibit equal signal-to-noise ratios $Sn_1$ to $Sn_M$. As a result the same maximal data rate can be transmitted over the transmission lines $L_1$ to $L_M$. The method is performed either for downstream or for upstream direction and for a single frequency channel.

The input power levels $p_1$ to $p_M$ of the signals provided to the transmission lines $L_1$ to $L_M$, the signal-to-noise ratios $Sn_1$ to $Sn_M$ measured at the output terminals of the transmission lines $L_1$ to $L_M$ and the logarithmic signal-to-noise ratios $Sndb_1$ to $Sndb_M$ are combined in vectors p, Sn and Sndb, respectively:

$$p = \begin{bmatrix} p_1 \\ p_2 \\ \vdots \\ p_M \end{bmatrix} \quad (10)$$

$$Sn = \begin{bmatrix} Sn_1 \\ Sn_2 \\ \vdots \\ Sn_M \end{bmatrix} \quad (11)$$

$$Sndb = \begin{bmatrix} Sndb_1 \\ Sndb_2 \\ \vdots \\ Sndb_M \end{bmatrix}. \quad (12)$$

According to one embodiment, at the first cycle of the method, which is denoted with k=1, signals are simultaneously provided to the transmission lines $L_1$ to $L_M$ having the highest input power level $p_{max}$:

$$p(k=1) = \begin{bmatrix} p_{max} \\ p_{max} \\ \vdots \\ p_{max} \end{bmatrix} \quad (13)$$

The signal-to-noise ratios $Sn(1)_1$ to $Sn(1)_M$ of the signals, which are received at the output terminals of the transmission lines $L_1$ to $L_M$, are measured. According to a further embodiment, the signal-to-noise ratios $Sn(1)_1$ to $Sn(1)_M$ measured in the first cycle of the method (k=1) are used for determining the input power levels p(k=2) of the second cycle:

$$p(k=2) = \begin{bmatrix} \left(\frac{1}{Sn(1)_1}\right) \\ \left(\frac{1}{Sn(1)_2}\right) \\ \vdots \\ \left(\frac{1}{Sn(1)_M}\right) \end{bmatrix}. \quad (14)$$

According to one embodiment, the vector p(2) is scaled:

$$\hat{p}(2) = p(2) \cdot \frac{p_{max}}{\max(p(2))} \quad (15)$$

In equation (15) max(p(2)) denotes the maximum component of the vector p(2) of equation (14). The scaling prevents exceeding the maximum power level $p_{max}$.

The scaled vector $\hat{p}(2)$ provides the input power levels for the signals provided to the input terminals of the transmission lines $L_1$ to $L_M$ during the second cycle of the method. At the output terminals of the transmission lines $L_1$ to $L_M$ the signal-to-noise ratios $Sn(2)_1$ to $Sn(2)_M$ or the logarithmic signal-to-noise ratios $Sndb(2)_1$ to $Sndb(2)_M$ are measured. Transmitting signals over the transmission lines $L_1$ to $L_M$ and measuring their signal-to-noise ratios $Sn(k)_1$ to $Sn(k)_M$ or their logarithmic signal-to-noise ratios $Sndb(k)_1$ to $Sndb(k)_M$ is then iteratively repeated.

The iterations are repeated until the measured signal-to-noise ratios $Sn(k)_1$ to $Sn(k)_M$ or the measured logarithmic signal-to-noise ratios $Sndb(k)_1$ to $Sndb(k)_M$ reach sufficient convergence (k=$k_{max}$). At each of the iteration cycles k=2 to k=$k_{max}$−1 the signal-to-noise ratios $Sn(k)_1$ to $Sn(k)_M$ or the logarithmic signal-to-noise ratios $Sndb(k)_1$ to $Sndb(k)_M$ of the signals received at the output terminals of the transmission lines $L_1$ to $L_M$ are measured and used for setting the input power levels $p(k+1)$ of the signals provided to the input terminals of the transmission lines $L_1$ to $L_M$ during the next iteration cycle $k+1$:

$$p(k+1)=p(k)\cdot|1-g\cdot x(k)| \qquad (16)$$

In equation (16) g is a predetermined constant, which influences the convergence of the method, and $x(k)$ is calculated as follows:

$$x(k) = Sndb(k) - \frac{1}{M}\left|\sum_{i=1}^{M} Sndb(k)_i\right|. \qquad (17)$$

Before the determined input power levels are used for providing signals to the transmission lines $L_1$ to $L_M$, the vector $p(k+1)$ may be scaled:

$$\hat{p}(k+1) = p(k+1)\cdot \frac{p_{max}}{\max(p(k+1))}. \qquad (18)$$

In equation (18) $\max(p(k+1))$ denotes the maximum component of the vector $p(k+1)$. The scaled vector $\hat{p}(k+1)$ is used for providing signals to the transmission lines $L_1$ to $L_M$ at the iteration cycle $k+1$.

In the following a simulation is presented which illustrates the method described above. The simulated network comprises 50 transmission lines $L_1$ to $L_{50}$. The lengths of the transmission lines $L_1$ to $L_{50}$ are evenly distributed between 200 m and 800 m. The network is based on a model as shown in FIG. 3. FIG. 4 illustrates the convergence of the applied iterative method. In FIG. 4 a difference $d(k)$ is plotted versus the iteration index k. The difference $d(k)$ is the difference between the maximum logarithmic signal-to-noise ratio and the minimum logarithmic signal-to-noise ratio measured at each iteration cycle k:

$$d(k)=\max(Sndb(k))-\min(Sndb(k)) \qquad (19)$$

The upper diagram of FIG. 4 shows the difference $d(k)$ on a linear scale, whereas the lower diagram of FIG. 4 shows the difference $d(k)$ on a logarithmic scale. It can be seen from FIG. 4 that the difference $d(k)$ between the maximum logarithmic signal-to-noise ratio and the minimum logarithmic signal-to-noise ratio becomes smaller than 0.01 dB after 6 iteration cycles which means that the logarithmic signal-to-noise ratios measured at the output terminals of the transmission lines $L_1$ to $L_{50}$ have sufficiently converged at this point in time.

Figure 5A:
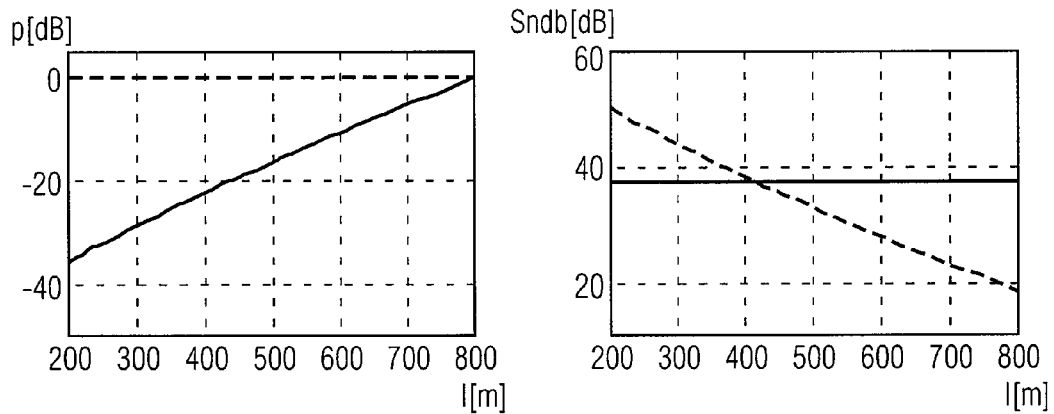
FIGS. 5A to 5C illustrate exemplary results of a simulation of an iterative method according to an embodiment.
Figure 5B:
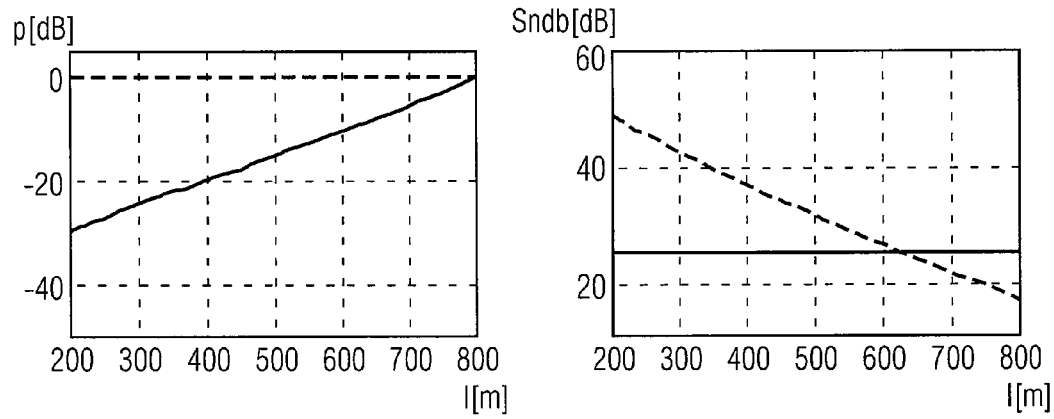
Figure 5C:
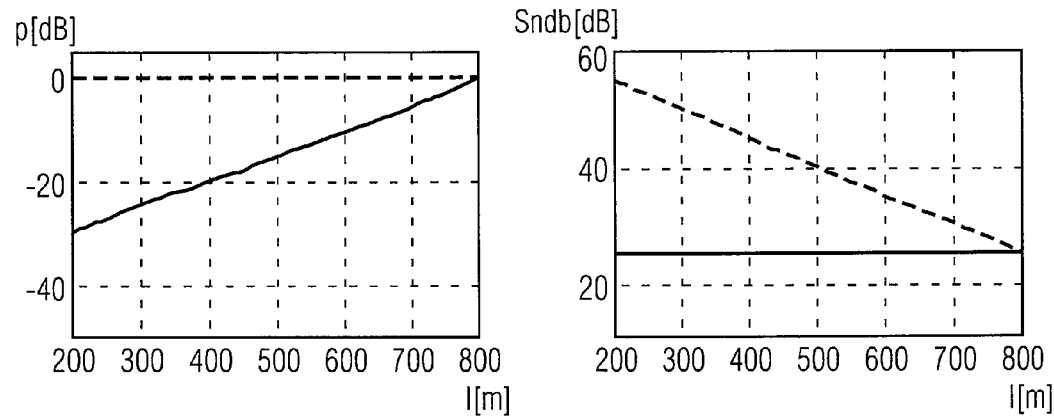
Figure 6A:
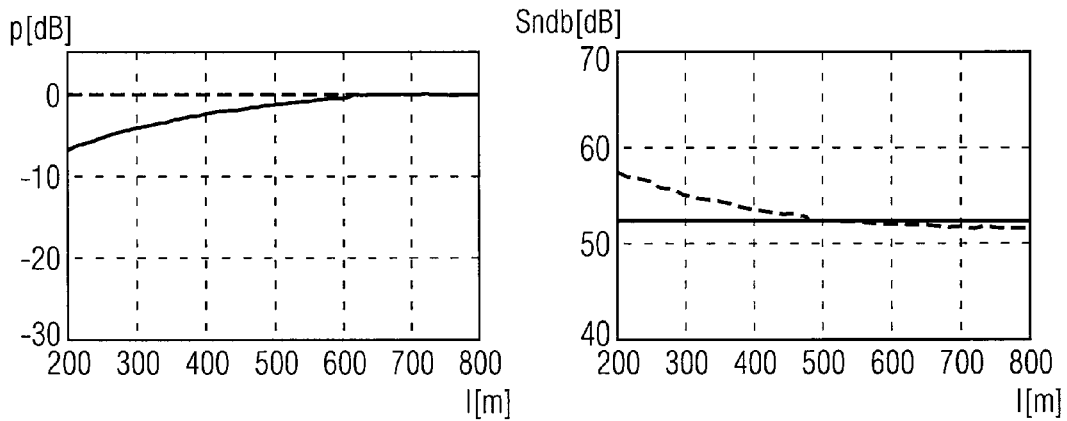
FIGS. 6A to 6C illustrate exemplary results of a simulation of an iterative method according to an embodiment.
Figure 6B:
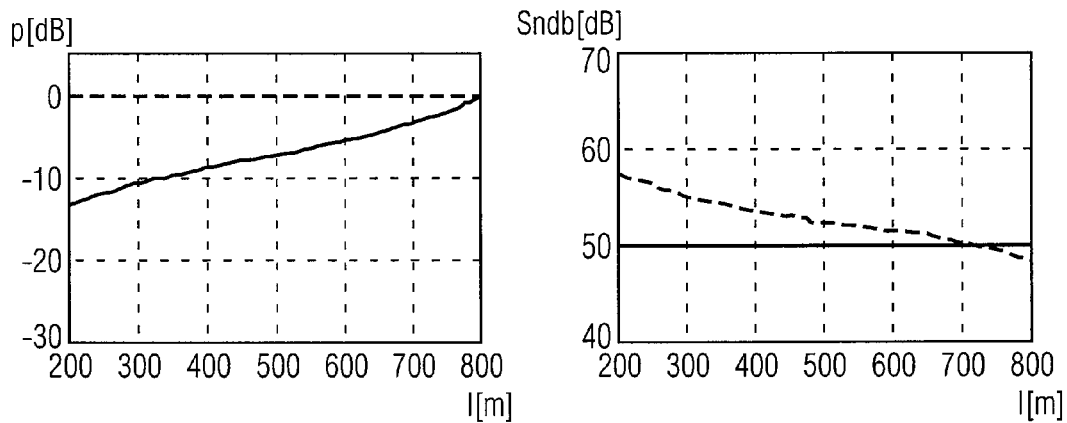
Figure 6C:
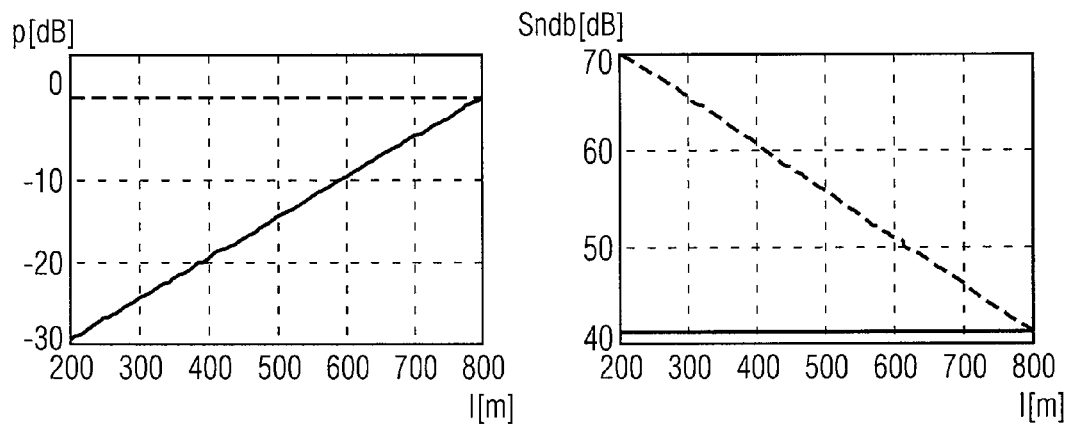

FIGS. 5 and 6 show plots of the input power level p versus the length l of the transmission lines and plots of the resulting logarithmic signal-to-noise ratios Sndb versus the length l in the presence of only FEXT (cf. FIGS. 5A and 6A), FEXT and alien noise (cf. FIGS. 5B and 6B) as well as only alien noise (cf. FIGS. 5C and 6C). FIG. 5 refers to signals transmitted in upstream direction and FIG. 6 refers to signals transmitted in downstream direction. Data illustrated by dashed lines were recorded when the maximum power level $p_{max}$ (=0 dB) was used for providing signals to the transmission lines $L_1$ to $L_{50}$. Data illustrated by continuous lines were recorded after the iterative method described above had reached convergence $(k=k_{max})$.

It is evident from FIGS. 5 and 6 that performing the iterative method described above results in a convergence of the signal-to-noise ratios of all transmission lines. It can be further seen from FIGS. 5 and 6 that the more FEXT interference occurs, the more the iterative method leads to an improvement of the signal-to-noise ratios of the long transmission lines, whereas the signal-to-noise ratios of the short transmission lines are decreased due to the iterative method.

Further, a comparison of the FIGS. 5 and 6 reveals that the improvement of the behavior of the longer transmission lines is more striking for the upstream direction than for the downstream direction.

Figure 7:
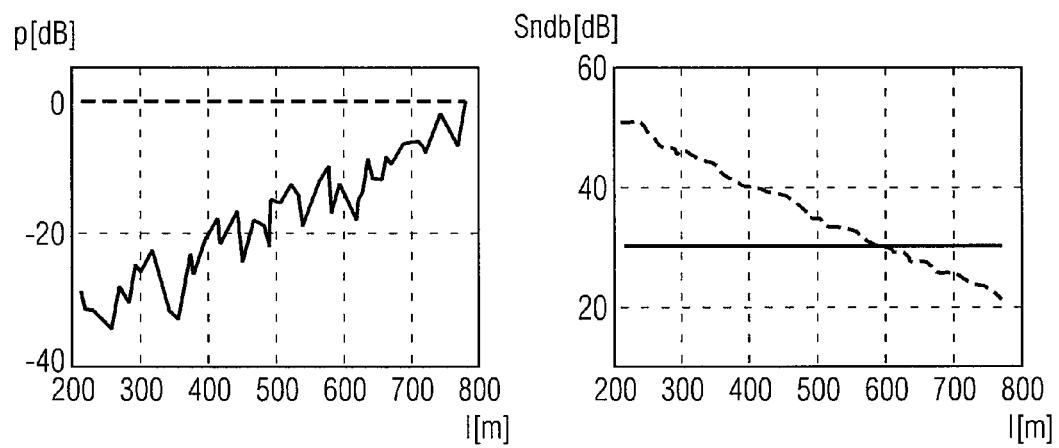
FIG. 7 illustrates exemplary results of a simulation of an iterative method according to an embodiment.

FIG. 7 illustrates the simulated behavior of a further network. The simulated network comprises 50 transmission lines $L_1$ to $L_{50}$, the lengths of which are statistically distributed between 200 m and 800 m. Moreover, the factor $K_{ij}$ and the alien noise are also statistically distributed to a certain degree. In FIG. 7 a plot of the input power level p versus the length l of the transmission lines and a plot of the resulting logarithmic signal-to-noise ratio Sndb versus the length l in the presence of FEXT and alien noise are shown. The data shown in FIG. 7 were recorded in upstream direction. Data illustrated by dashed lines were recorded when the maximum input power level $p_{max}$ (=0 dB) was used for the providing signals to the transmission lines $L_1$ to $L_{50}$. Data illustrated by continuous lines were recorded after the iterative method had reached convergence.

Since the method according to the embodiment described above improves the signal-to-noise ratios of longer transmission lines especially if FEXT is the dominant source of interference, it is interesting to know a measure of the presence of FEXT compared to alien noise. Such a measure is given by a variable $\eta$:

$$\eta = \frac{a}{b} \qquad (20)$$

In equation (20) variables a and b are introduced. The variables a and b are defined as follows:

$$a=\max(Sndb(1))-\min(Sndb(k_{max})) \qquad (21)$$

$$b=\max(Sndb(1))-\min(Sndb(1)) \qquad (22)$$

Figure 8:
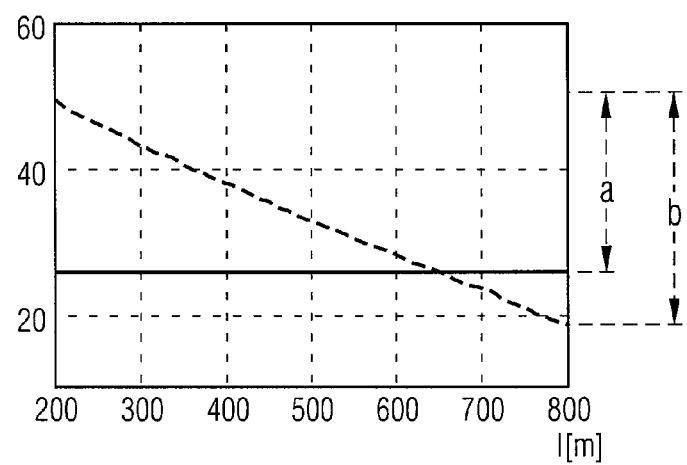
FIG. 8 illustrates definitions of variables a and b.

In equations (21) and (22) the terms max $(Sndb(1))$ and min $(Sndb(1))$ denote the maximum and minimum components of the vector Sndb at $k=1$, respectively, when signals are provided to the transmission lines at the maximum power level. The term min $(Sndb(k_{max}))$ denotes the maximum component of the vector Sndb when the iterative method has reached sufficient convergence meaning min $(Sndb(k_{max}))\approx$max $(Sndb(k_{max}))$. The definitions of the variables a and b are also illustrated in FIG. 8.

If FEXT does not occur, the variable $\eta$ is one. The higher the presence of FEXT, the more the variable $\eta$ decreases.

In the following a further iterative method according to one embodiment is described which improves the signal-to-noise ratios of the shorter transmission lines compared to the iterative method described above. The improvement is achieved by successively increasing the input power levels of the signals provided to the transmission lines $L_1$ to $L_{M-1}$ until the logarithmic signal-to-noise ratio obtained from at least one transmission line, which is usually the longest transmission line $L_M$, falls below a predetermined threshold value $Sndb_{min}$. The input power level of the signals provided to the longest transmission line $L_M$ is kept constant.

Before starting the iterative method presented in the following input power levels $\tilde{p}(0)_i$ (i=1, ..., M) must be known, which, when used for providing signals to the transmission lines $L_1$ to $L_M$, produce equal logarithmic signal-to-noise ratios at the output terminals of the transmission lines $L_1$ to $L_M$. For example, the input power levels $\tilde{p}(0)_i$ are given by the input power levels $p(k_{max})_i$, which are obtained in the final iteration cycle $k_{max}$ of the iterative method presented above and which produced an equal logarithmic signal-to-noise ratio $Sndb(k_{max})_i$ for all transmission lines $L_1$ to $L_M$.

Starting from the input power levels $\tilde{p}(0)_i$, the input power levels are successively increased at each iteration cycle until the logarithmic signal-to-noise ratio measured at the output terminal of at least one transmission line $L_i$ is reduced by more than a predetermined parameter $\Delta db$ compared to the logarithmic signal-to-noise level $Sndb(k_{max})_i$.

According to one embodiment, before starting the iterative method it is verified whether $\Delta db < b-a$. If this inequation is false, the maximum power level $p_{max}$ is chosen for all of the transmission lines $L_1$ to $L_M$ and the iterative method is not performed any further. If the inequation is true, the iterative method is started.

The iteration cycles of the method are denoted with $\tilde{k}$ (=1, 2, ...). At the beginning of each iteration cycle signals are provided to the input terminals of the transmission lines $L_1$ to $L_M$. The signals are received at the output terminals of the transmission lines $L_1$ to $L_M$ and the logarithmic signal-to-noise ratios $Sndb(\tilde{k})_i$ are measured for each signal. The input power levels $\tilde{p}(\tilde{k})$ for each iteration cycle $\tilde{k}$ are given by the following equations:

$$\tilde{p}(\tilde{k}) = \begin{bmatrix} \tilde{p}(\tilde{k})_1 \\ \tilde{p}(\tilde{k})_2 \\ \vdots \\ \tilde{p}(\tilde{k})_M \end{bmatrix} \quad (23)$$

$$\tilde{p}(\tilde{k}+1) = \tilde{p}(\tilde{k}) \cdot |1 - \tilde{g} \cdot \tilde{d}(\tilde{k})| \quad (24)$$

$$\tilde{p}(0) = p(k_{max}). \quad (25)$$

In equation (24) $\tilde{g}$ is a predetermined constant, which influences the convergence of the method, and $\tilde{d}(\tilde{k})$ is a vector of functions $\tilde{F}$ of the input power levels $\tilde{p}(\tilde{k})_i$, which will be discussed in more detail later:

$$\tilde{d}(\tilde{k})_i = \tilde{F}\left(\frac{\tilde{p}(\tilde{k})_i}{p_{max}}\right) \quad (26)$$

Before the input power levels $\tilde{p}(\tilde{k}+1)_i$ are used for providing signals to the transmission lines $L_1$ to $L_M$, the vector $\tilde{p}(\tilde{k}+1)$ may be scaled:

$$\hat{\tilde{p}}(\tilde{k}+1) = \tilde{p}(\tilde{k}+1) \cdot \frac{p_{max}}{\max(\tilde{p}(\tilde{k}+1))} \quad (27)$$

In equation (27) $\max(\tilde{p}(\tilde{k}+1))$ denotes the maximum component of the vector $\tilde{p}(\tilde{k}+1)$. The scaled vector $\hat{\tilde{p}}(\tilde{k}+1)$ is used for transmitting signals during the iteration cycle $\tilde{k}+1$ over the transmission lines $L_1$ to $L_M$. Scaling causes the input power level $\hat{\tilde{p}}(\tilde{k}+1)_M$ of the longest transmission line $L_M$ to be constant.

According to a further embodiment, the vector $\tilde{p}(\tilde{k}+1)$ of equation (24) is shifted once more:

$$\bar{\tilde{p}}(\tilde{k}+1) = |\tilde{p}(\tilde{k}+1) - \bar{\tilde{g}} \cdot \tilde{d}(\tilde{k}) \cdot p_{max}| \quad (28)$$

In equation (28) $\bar{\tilde{g}}$ is a predetermined constant. The vector $\bar{\tilde{p}}(\tilde{k}+1)$ may be scaled:

$$\hat{\bar{\tilde{p}}}(\tilde{k}+1) = \bar{\tilde{p}}(\tilde{k}+1) \cdot \frac{p_{max}}{\max(\bar{\tilde{p}}(\tilde{k}+1))} \quad (29)$$

The termination condition of the iterative method is:

$$\min(Sndb(\tilde{k}_{max})_i) < \min(Sndb(k_{max})) - \Delta db \quad (30)$$

According to equation (30) the iterative method is terminated or at least interrupted if at least one of the measured logarithmic signal-to-noise ratios at a iteration cycle $\tilde{k}_{max}$ falls below the difference $\min(Sndb(k_{max})) - \Delta db$. In this case the iterative method is either terminated or it is started again with smaller constants $\tilde{g}$ and $\bar{\tilde{g}}$. For restarting the iterative method input power levels $\tilde{p}(\tilde{k} < \tilde{k}_{max})$ are used.

In the following a simulation is presented which illustrates the iterative method described above. The simulated network is a VDSL network and comprises 25 transmission lines $L_1$ to $L_{25}$ in a cable C. The lengths of the transmission lines $L_1$ to $L_{25}$ are evenly distributed between 200 m and 700 m. The network is based on a model as shown in FIG. 3. The type of interference is self-FEXT and alien noise. The parameter $\Delta db$ is set to 3 dB. For the function $\tilde{F}$ (cf. equation (26)) a linear function, a exponential function and a logarithmic function are chosen:

$$\tilde{F}\left(\frac{\tilde{p}(\tilde{k})_i}{p_{max}}\right) = \frac{\tilde{p}(\tilde{k})_i}{p_{max}} \quad (31)$$

$$\tilde{F}\left(\frac{\tilde{p}(\tilde{k})_i}{p_{max}}\right) = 100^{\frac{\tilde{p}(\tilde{k})_i}{p_{max}}} \quad (32)$$

$$\tilde{F}\left(\frac{\tilde{p}(\tilde{k})_i}{p_{max}}\right) = \log_{10}\left(\frac{\tilde{p}(\tilde{k})_i}{p_{max}}\right) \quad (33)$$

Figure 9:
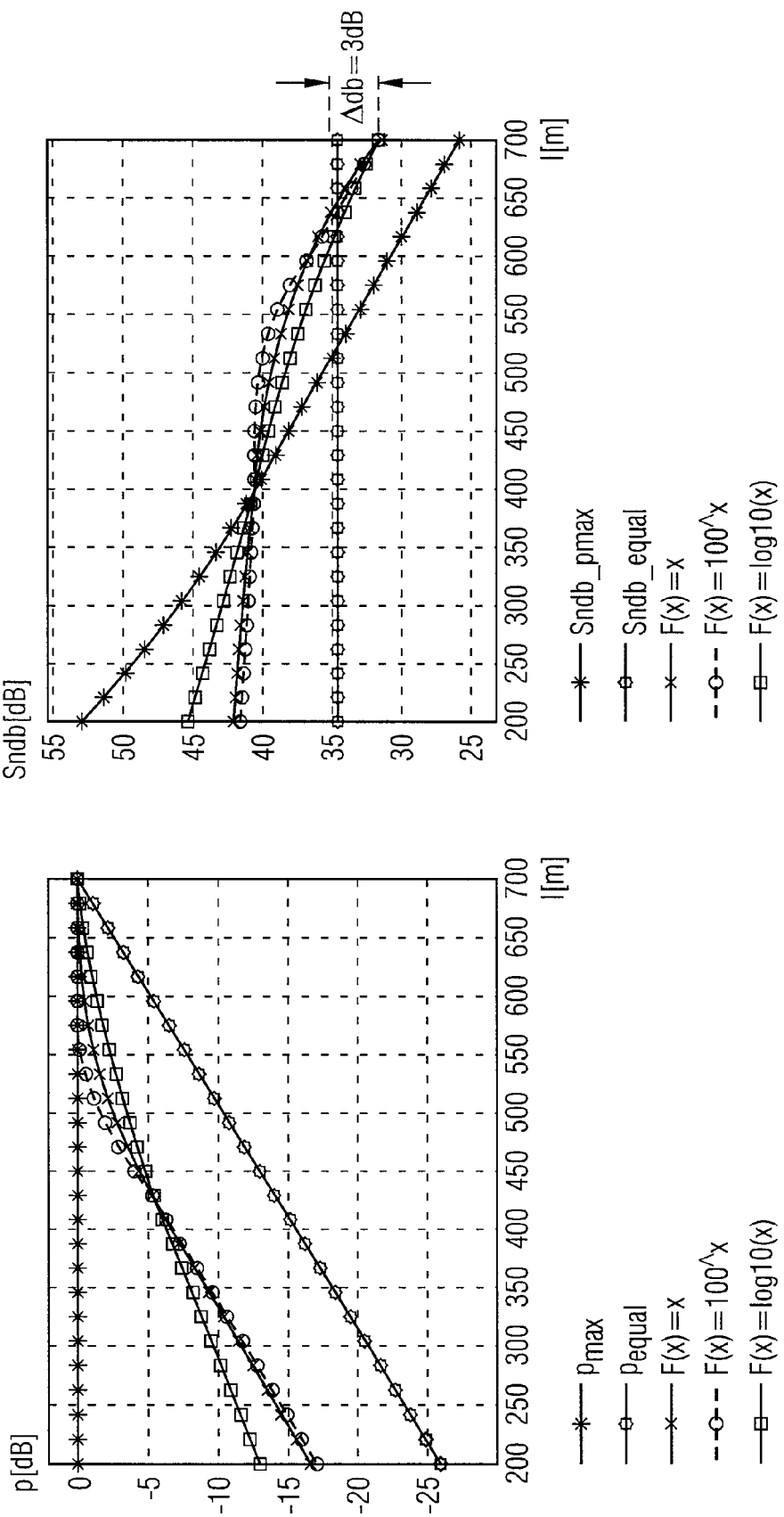
FIG. 9 illustrates exemplary results of a simulation of an iterative method according to an embodiment.

FIG. 9 shows a plot of the input power level p versus the length l of the transmission lines $L_1$ to $L_{25}$ and a plot of the resulting logarithmic signal-to-noise ratio Sndb versus the length l in the presence of FEXT and alien noise. The three functions $\tilde{F}$ according to equations (31) to (33) were used for the simulation. It is evident from FIG. 9 that performing the iterative method described above results in better logarithmic signal-to-noise ratios for shorter transmission lines, whereas the signal-to-noise ratios of the longer transmission lines are only slightly decreased.

So far, methods for determining input power levels for a single frequency channel were discussed. In order to adjust the total power spectrum density of all modems, the described iterative methods may be performed for all frequency channels. For that, signals of different frequency channels can be transmitted over the transmission lines simultaneously.

Figure 10:
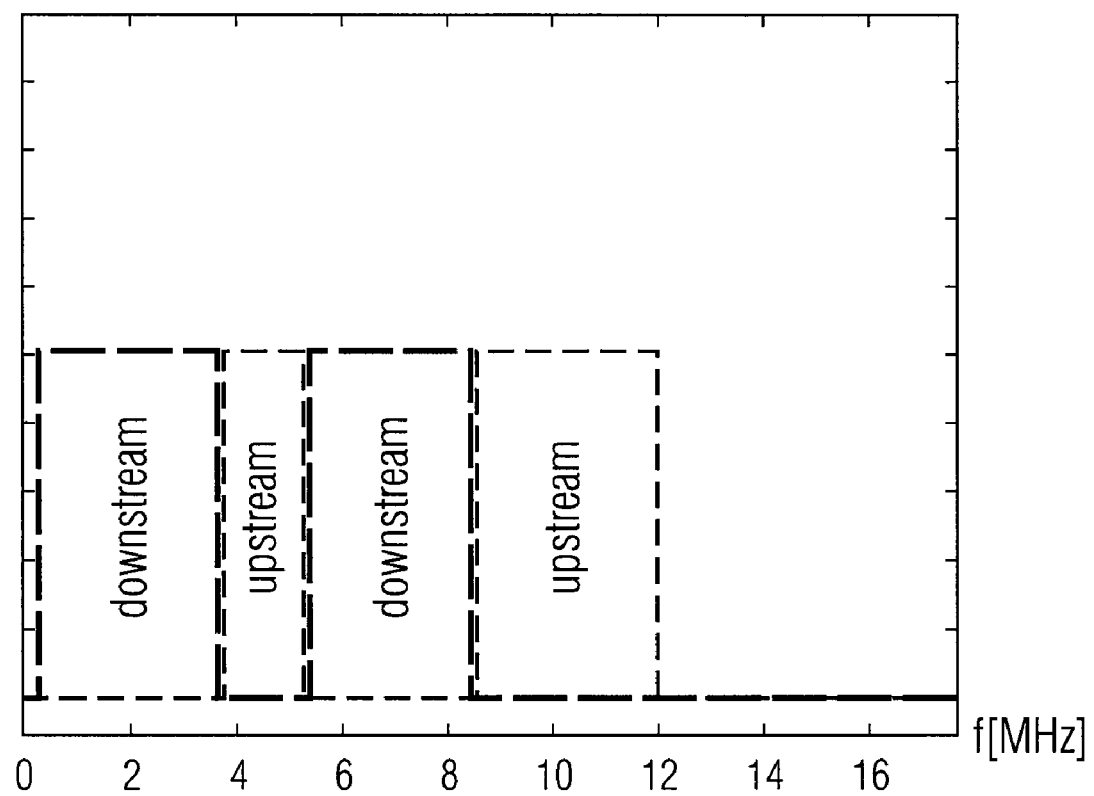
FIG. 10 illustrates frequency band allocation of an exemplary VDSL network.
Figure 11:
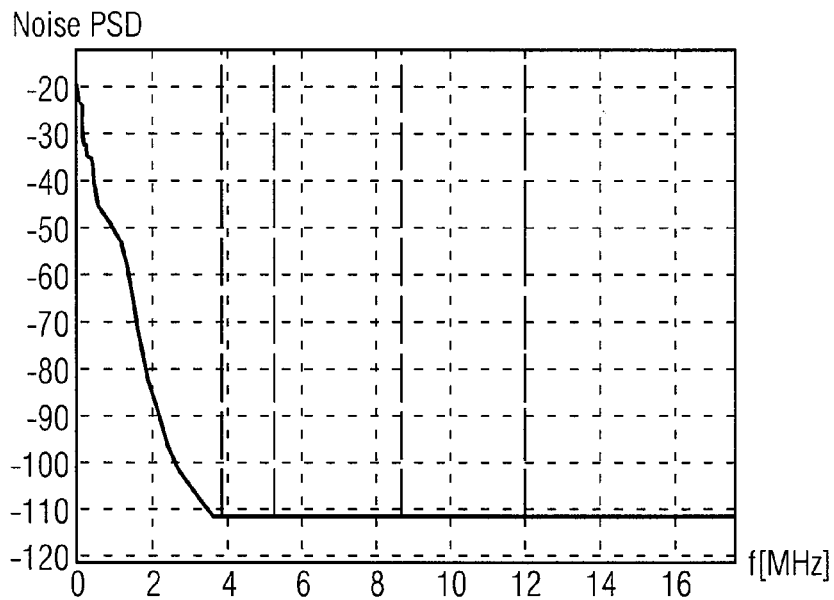
FIG. 11 illustrates an assumed power spectral density of alien noise.
Figure 12:
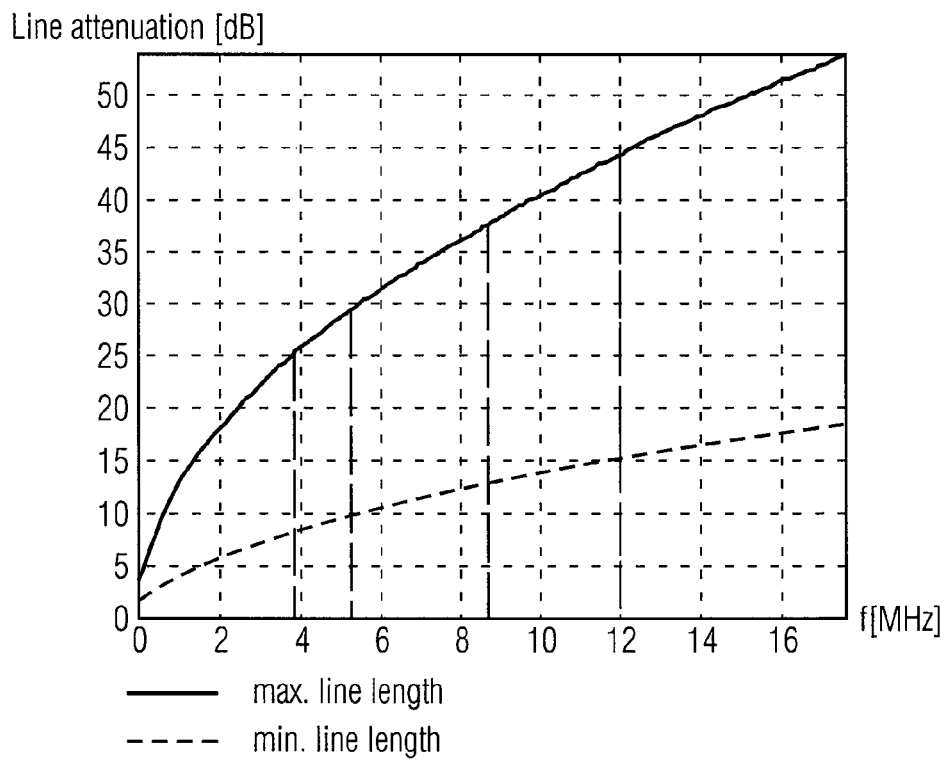
FIG. 12 illustrates line attenuations of the shortest and the longest transmission line.
Figure 13:
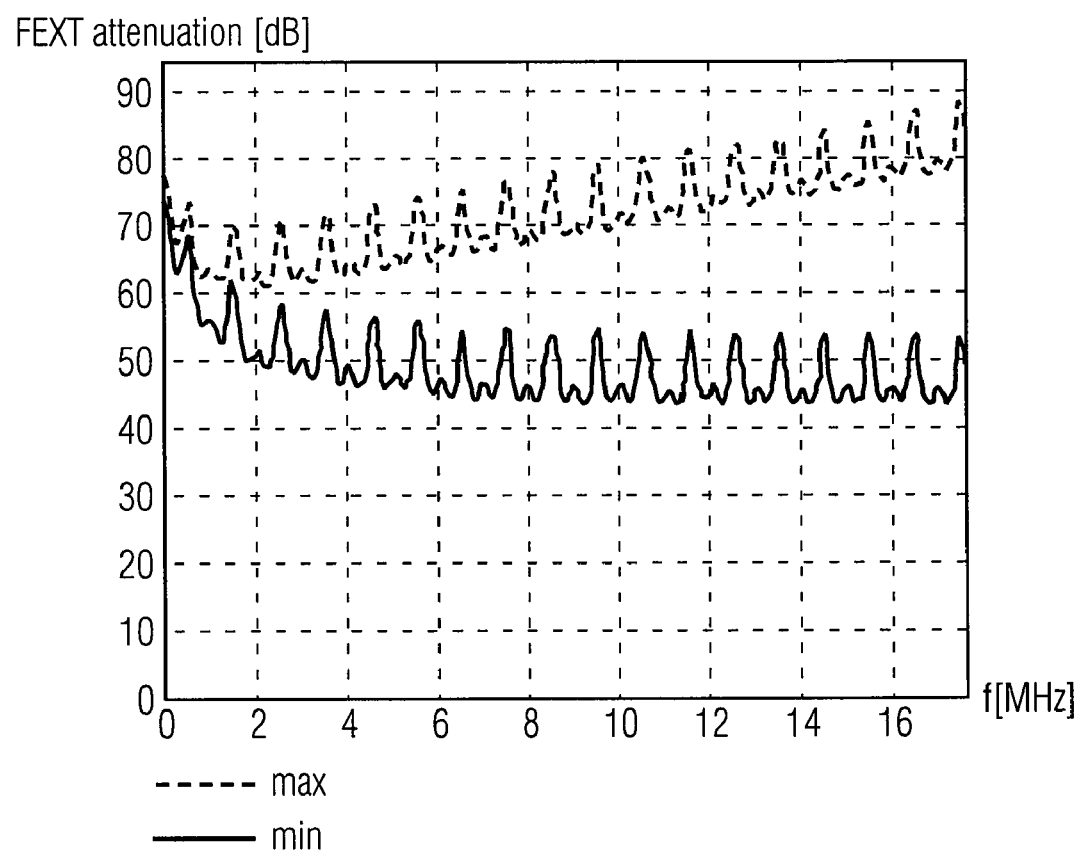
FIG. 13 illustrates minimum and maximum FEXT attenuations.

In the following another example is presented in order to demonstrate the performance of the iterative methods discussed above. The example is based on a VDSL network having a frequency band allocation as shown in FIG. 10. The maximum input power level is the same for all frequency channels. The maximum power spectrum density is −59 dBm/Hz. In this example only the upstream direction is considered. The assumed power spectral density of the alien noise is shown in FIG. 11. All interference signals caused by alien noise have the same power level. The alien noise is superposed by an additional white noise signal having a power spectral density of −140 dBm/Hz. The simulated network comprises 25 transmission lines $L_1$ to $L_{25}$ in a cable C. The lengths of the transmission lines $L_1$ to $L_{25}$ are evenly distributed between 200 m and 600 m. FIG. 12 shows the line attenuation of the shortest and the longest transmission line. FIG. 13 shows the minimum and maximum FEXT attenuation. The factor $K_{ij}$ is constant.

The predetermined parameter $\Delta db$ is modified in order to be dependent on the fraction of the alien noise. The modified parameter $\Delta \overline{db}(f)$ is calculated for each frequency channel as follows:

$$\Delta \overline{db}(f) = \left(\frac{\eta(f)}{\eta_{max}}\right)^4 \cdot \Delta db. \quad (34)$$

Figure 14:
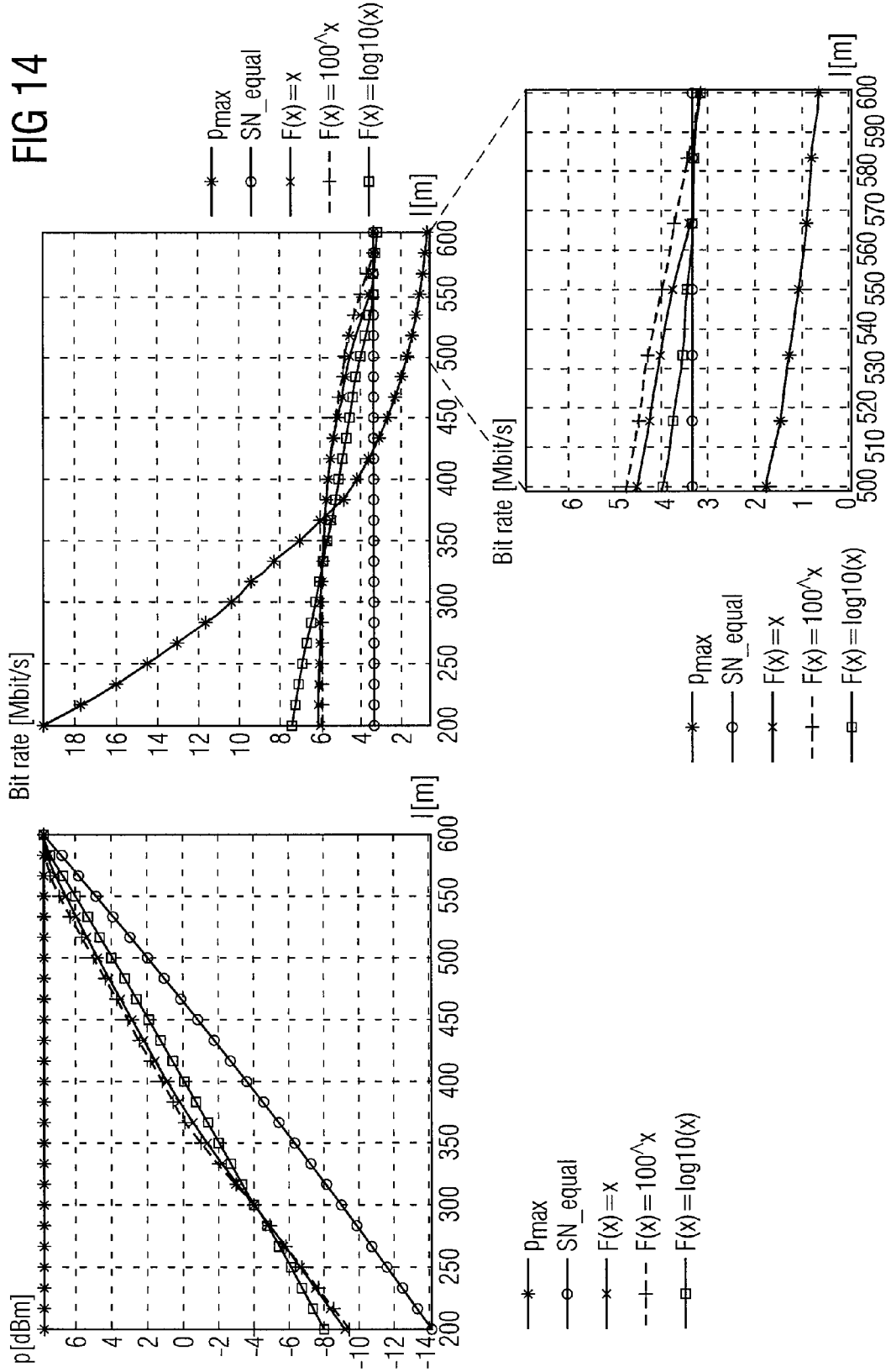
FIG. 14 illustrates exemplary results of a simulation of an iterative method according to an embodiment.
Figure 15:
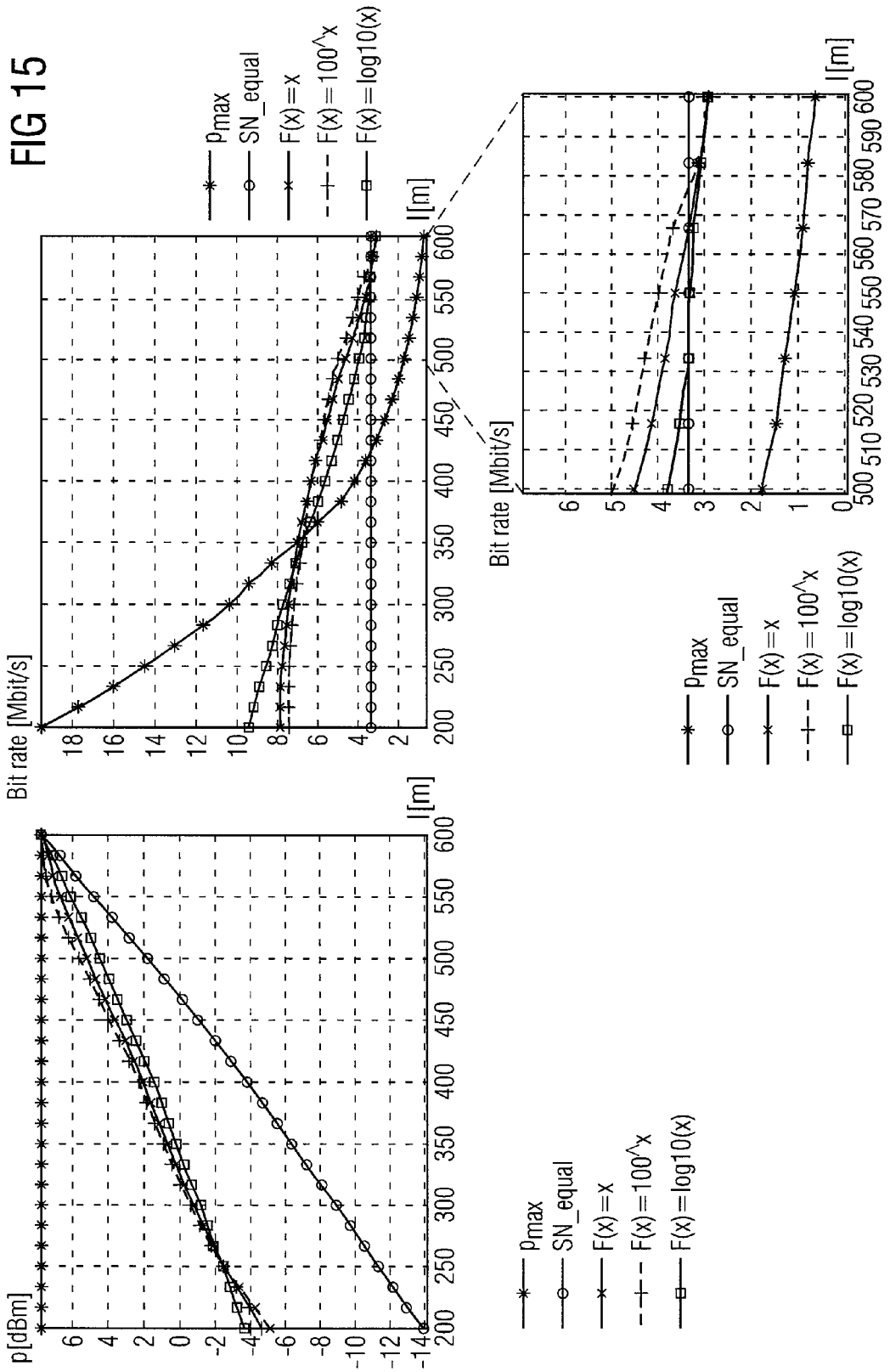
FIG. 15 illustrates exemplary results of a simulation of an iterative method according to an embodiment.
Figure 16:
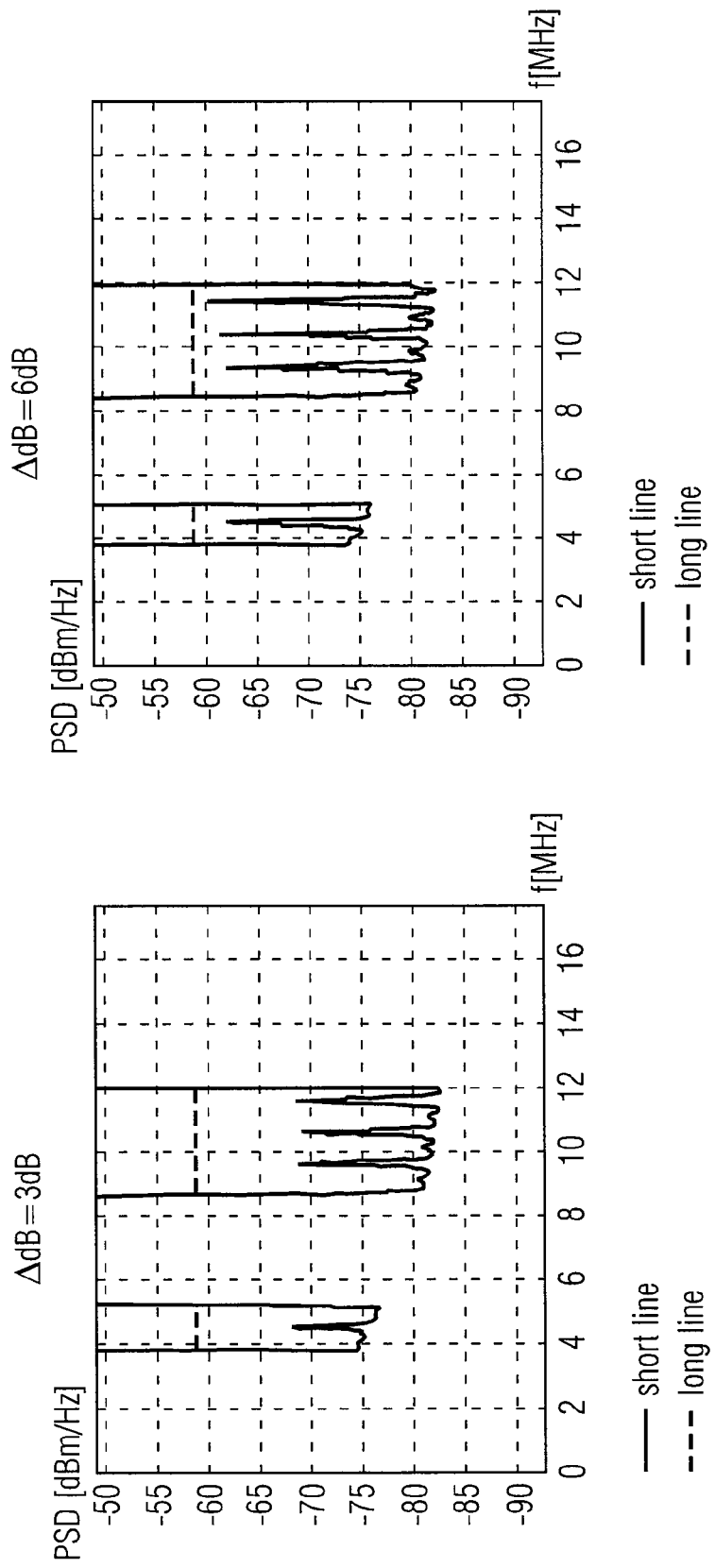
FIG. 16 illustrates spectral power densities for the shortest and the longest transmission line.

FIGS. 14 and 15 illustrate the results of the simulation. The input power levels p for each of the transmission lines $L_1$ to $L_{25}$ are shown. The maximum bit rates for each of the transmission lines $L_1$ to $L_{25}$ are also shown. The maximum bit rates were calculated by adding the maximum bit rates of each frequency channel, which were derived from the logarithmic signal-to-noise ratios. The parameter $\Delta db$ was set to 3 dB for the simulation illustrated in FIG. 14 and 6 dB for the simulation illustrated in FIG. 15. FIG. 16 shows the spectral power density of the shortest and the longest transmission line for $\Delta db=3$ dB and $\Delta db=6$ dB.

FIG. 17 illustrates the results of another simulation. Here, the transmission lines $L_1$ to $L_{25}$ have lengths between 200 m and 600 m, which are statistically distributed. The factor $K_{ij}$ and the alien noise are also statistically distributed to a certain degree. The parameter $\Delta db$ was set to 6 dB.

In addition, while a particular feature or aspect of an embodiment may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". The terms "coupled" and "connected", along with derivatives may have been used. It should be understood that these terms may have been used to indicate that two elements co-operate or interact with each other regardless whether they are in direct physical or electrical contact, or they are not in direct contact with each other. Furthermore, it should be understood that embodiments may be implemented in discrete circuits, partially integrated circuits or fully integrated circuits or programming means. Also, the term "exemplary" is merely meant as an example, rather than the best or optimal. It is also to be appreciated that features and/or elements depicted herein are illustrated with particular dimensions relative to one another for purposes of simplicity and ease of understanding, and that actual dimensions may differ substantially from that illustrated herein.

What is claimed is:

1. A method, wherein the following steps are iteratively repeated, comprising:
   providing each of a plurality of signals at a respective one of a plurality of transmission links, the transmission links being wired lines wherein neighboring ones of the transmission links are distorted by cross-talk interference;
   transmitting each of the plurality of signals over the respective one of the plurality of transmission links; and
   measuring signal-to-noise ratios of the plurality of signals transmitted over the plurality of transmission links, wherein an input power level of each of the plurality of signals is set such that the signal-to-noise ratios of the plurality of signals converge when measured after their transmission over the plurality of transmission links;
   wherein, at each iteration cycle, the input power level of each of the plurality of signals when provided at the respective one of the plurality of transmission links depends on the difference of the measured signal-to-noise ratio of the signal transmitted over the respective one of the plurality of transmission links during the previous iteration cycle and an average value of the measured signal-to-noise ratios of the plurality of signals transmitted over the plurality of transmission links during the previous iteration cycle.

2. The method of claim 1, wherein the input power level of each of the plurality of signals is predetermined at the first iteration cycle.

3. The method of claim 1, wherein the input power level of each of the plurality of signals is set to the highest input power level at the first iteration cycle.

4. The method of claim 1, wherein the input power level of each of the plurality of signals when provided to the respective one of the plurality of transmission links during the second iteration cycle depends on the inverted value of the measured signal-to-noise ratio of the signal transmitted over the respective one of the plurality of transmission links during the first iteration cycle.

5. The method of claim 1, wherein each of the plurality of transmission links is a transmission line.

6. The method of claim 1, wherein xDSL is used as service for transmitting data over the transmission links.

7. The method of claim 1, wherein each of the plurality of signals is transmitted in upstream direction over the respective one of the plurality of transmission links.

8. The method of claim 1, wherein the input power levels, at which the signal-to-noise ratios converge, are used for transmitting further signals.

9. The method of claim 1, wherein the method is performed when initializing the plurality of transmission links.

10. The method of claim 1, wherein the transmission links are twisted wire pairs.

11. The method of claim 1, wherein the plurality of signals are transmitted by electrical transmission.

12. The method of claim 1, wherein at least two of the wired lines have different lengths.

13. A method, wherein the following steps are iteratively repeated, comprising:
    providing each of a plurality of signals at a respective one of a plurality of transmission links, the transmission links being wired lines wherein neighboring ones of the transmission links are distorted by cross-talk interference;
    transmitting each of the plurality of signals over the respective one of the plurality of transmission links; and
    measuring signal-to-noise ratios of the plurality of signals transmitted over the plurality of transmission links, wherein an input power level of each of the plurality of signals is set such that the signal-to-noise ratios of the plurality of signals converge when measured after their transmission over the plurality of transmission links;
    wherein the input power level of each of the plurality of signals when provided at the respective one of the plurality of transmission links depends on a product having at least a first factor and a second factor; the first factor depends on the input power level of the signal provided at the respective one of the plurality of transmission links during the previous iteration cycle; and the second factor depends on the difference of the measured signal-to-noise ratio of the signal transmitted over the respective one of the plurality of transmission links during the previous iteration cycle and an average value of the measured signal-to-noise ratios of the plurality of signals transmitted over the plurality of transmission links during the previous iteration cycle.

14. A method, wherein the following steps are iteratively repeated, comprising:

for a plurality of transmission lines being wired lines wherein neighboring ones of the transmission lines are distorted by cross-talk interference, each of the transmission lines having an input terminal and an output terminal, providing each of a plurality of first signals at the input terminal of a respective one of the plurality of transmission lines and receiving each of the plurality of transmitted first signals at the output terminal of the respective one of the plurality of transmission lines;

measuring signal-to-noise ratios of the plurality of transmitted first signals received at the output terminals; and providing each of a plurality of second signals at the input terminal of a respective one of the plurality of transmission lines, wherein an input power level of each of the plurality of second signals when provided to the input terminal of the respective one of the plurality of transmission lines is set depending on the measured signal-to-noise ratios of the plurality of transmitted first signals;

wherein, at each iteration cycle, the input power level of each of the plurality of signals when provided at the respective one of the plurality of transmission links depends on the difference of the measured signal-to-noise ratio of the signal transmitted over the respective one of the plurality of transmission links during the previous iteration cycle and an average value of the measured signal-to-noise ratios of the plurality of signals transmitted over the plurality of transmission links during the previous iteration cycle.

15. The method of claim 14, wherein each of the plurality of first signals when provided to the input terminal of the respective one of the plurality of transmission lines has a predetermined input power level.

16. The method of claim 14, wherein each of the plurality of first signals when provided to the input terminal of the respective one of the plurality of transmission lines has the highest input power level.

17. A method, wherein the following steps are iteratively repeated, comprising:

for a plurality of transmission lines being wired lines wherein neighboring ones of the transmission lines are distorted by cross-talk interference, each of the transmission lines having an input terminal and an output terminal, providing each of a plurality of first signals at the input terminal of a respective one of the plurality of transmission lines and receiving each of the plurality of transmitted first signals at the output terminal of the respective one of the plurality of transmission lines;

measuring signal-to-noise ratios of the plurality of transmitted first signals received at the output terminals;

providing each of a plurality of second signals at the input terminal of a respective one of the plurality of transmission lines, wherein an input power level of each of the plurality of second signals when provided to the input terminal of the respective one of the plurality of transmission lines is set depending on the measured signal-to-noise ratios of the plurality of transmitted first signals;

wherein the measured signal-to-noise ratios of the plurality of transmitted first signals are distributed over a first range of signal-to-noise ratios; and the input power level of each of the plurality of second signals when provided to the input terminal of the respective one of the plurality of transmission lines is set in such a manner that the signal-to-noise ratios of the plurality of second signals after being received at the output terminals are distributed over a second range of signal-to-noise ratios which is smaller than the first range of signal-to-noise ratios.

18. A method, wherein the following steps are iteratively repeated, comprising:

for a plurality of transmission lines being wired lines wherein neighboring ones of the transmission lines are distorted by cross-talk interference, each of the transmission lines having an input terminal and an output terminal, providing each of a plurality of first signals at the input terminal of a respective one of the plurality of transmission lines and receiving each of the plurality of transmitted first signals at the output terminal of the respective one of the plurality of transmission lines;

measuring signal-to-noise ratios of the plurality of transmitted first signals received at the output terminals; and providing each of a plurality of second signals at the input terminal of a respective one of the plurality of transmission lines, wherein an input power level of each of the plurality of second signals when provided to the input terminal of the respective one of the plurality of transmission lines is set depending on the measured signal-to-noise ratios of the plurality of transmitted first signals;

wherein the input power level of each of the plurality of second signals when provided to the input terminal of the respective one of the plurality of transmission lines depends on a product having at least a first factor and a second factor; the first factor depends on the input power level of the first signal when provided to the input terminal of the respective one of the plurality of transmission lines; and the second factor depends on the difference of the measured signal-to-noise ratio of the first signal transmitted over the respective one of the plurality of transmission lines and an average value of the measured signal-to-noise ratios of the plurality of transmitted first signals.

19. A method, wherein the following steps are iteratively repeated, comprising:

providing an input power level for each of a plurality of transmission links, the transmission links being wired lines wherein neighboring ones of the transmission lines are distorted by cross-talk interference wherein the input power levels are provided in such a manner that when providing each of a plurality of first signals to a respective one of a plurality of transmission links having the provided input power level and transmitting each of the plurality of first signals over the respective one of the plurality of transmission links, the signal-to-noise ratios of the plurality of transmitted first signals are equal; and iteratively repeating the following steps:

providing each of a plurality of second signals to a respective one of a plurality of transmission links;

transmitting each of the plurality of second signals over the respective one of the plurality of transmission links; and measuring signal-to-noise ratios of the plurality of second signals transmitted over the plurality of transmission links, wherein at each iteration cycle an input power level of at least one of the plurality of second signals when provided to the respective one of the plurality of transmission links is increased;

wherein, at each iteration cycle, the input power level of each of the plurality of second signals when provided at the respective one of the plurality of transmission links depends on the difference of the measured signal-to-noise ratio of the signal transmitted over the respective one of the plurality of transmission links during the previous iteration cycle and an average value of the measured signal-to-noise ratios of the plurality of signals transmitted over the plurality of transmission links during the previous iteration cycle.

20. The method of claim 19, wherein, at the first iteration cycle, the input power level of the at least one of the plurality of second signals when provided to the respective one of the plurality of transmission links is greater than the provided input power level for the respective one of the plurality of transmission links.

21. The method of claim 19, wherein the method is terminated when the measured signal-to-noise ratio of at least one of the plurality of transmitted second signals exceeds a predetermined threshold.

22. A method, wherein the following steps are iteratively repeated, comprising:

providing an input power level for each of a plurality of transmission links, the transmission links being wired lines wherein neighboring ones of the transmission lines are distorted by cross-talk interference wherein the input power levels are provided in such a manner that when providing each of a plurality of first signals to a respective one of a plurality of transmission links having the provided input power level and transmitting each of the plurality of first signals over the respective one of the plurality of transmission links, the signal-to-noise ratios of the plurality of transmitted first signals are equal; and iteratively repeating the following steps:

providing each of a plurality of second signals to a respective one of a plurality of transmission links;

transmitting each of the plurality of second signals over the respective one of the plurality of transmission links; and measuring signal-to-noise ratios of the plurality of second signals transmitted over the plurality of transmission links, wherein at each iteration cycle an input power level of at least one of the plurality of second signals when provided to the respective one of the plurality of transmission links is increased;

wherein the input power level of the at least one of the plurality of second signals when provided to the respective one of the plurality of transmission links depends on a product having at least a first factor and a second factor;

the first factor depends on the input power level of the second signal when provided to the respective one of the plurality of transmission links during the previous iteration cycle; and the second factor depends on a linear function or an exponential function or a logarithmic function of the input power level of the second signal transmitted over the respective one of the plurality of transmission links during the previous iteration cycle.

23. A non-transitory computer readable medium comprising: computer executable code for executing a method according to claim 1 on a computer system.

24. A device, comprising:

a plurality of output terminals to provide a plurality of signals to a plurality of transmission links, the transmission links being wired lines wherein neighboring ones of the transmission lines are distorted by cross-talk interference;

a plurality of input terminals to receive signal-to-noise ratios of the plurality of signals transmitted over the plurality of transmission links; and a plurality of setting circuits to set input power levels of the plurality of signals provided to the plurality of transmission lines, wherein the input power level of each of the plurality of signals is set such that the signal-to-noise ratios of the plurality of signals converge when measured after their transmission over the plurality of transmission links;

wherein, the input power level of each of the plurality of signals when provided at the respective one of the plurality of transmission links depends on the difference of the measured signal-to-noise ratio of the signal transmitted over the respective one of the plurality of transmission links during the previous iteration cycle and an average value of the measured signal-to-noise ratios of the plurality of signals transmitted over the plurality of transmission links during the previous iteration cycle.

25. The device of claim 24, wherein the input power levels, at which the signal-to-noise ratios converge, are used for transmitting further signals.

26. A system, comprising:

a plurality of transmission links being wired lines wherein neighboring ones of the transmission lines are distorted by cross-talk interference;

a plurality of transmitters to provide a plurality of signals to the plurality of transmission links;

a plurality of receivers to receive the plurality of signals transmitted over the plurality of transmission links;

a plurality of measuring circuits to measure signal-to-noise ratios of the plurality of signals transmitted over the plurality of transmission links; and a plurality of setting circuits to set input power levels of the plurality of signals provided to the plurality of transmission lines, wherein the input power level of each of the plurality of signals is set such that the signal-to-noise ratios of the plurality of signals converge when measured after their transmission over the plurality of transmission links;

wherein, the input power level of each of the plurality of signals when provided at the respective one of the plurality of transmission links depends on the difference of the measured signal-to-noise ratio of the signal transmitted over the respective one of the plurality of transmission links during the previous iteration cycle and an average value of the measured signal-to-noise ratios of the plurality of signals transmitted over the plurality of transmission links during the previous iteration cycle.

27. The system of claim 26, wherein the input power level of each of the plurality of signals depends on the measured signal-to-noise ratios of the plurality of signals transmitted over the plurality of transmission links during a previous transmission cycle.

28. The system of claim 26, wherein the input power levels, at which the signal-to-noise ratios converge, are used for transmitting further signals.

* * * * *